US012283435B2

United States Patent
Hirota et al.

(10) Patent No.: US 12,283,435 B2
(45) Date of Patent: Apr. 22, 2025

(54) SOLID ELECTROLYTIC CAPACITOR AND METHOD FOR MANUFACTURING SAME

(71) Applicant: Panasonic Intellectual Property Management Co., Ltd., Osaka (JP)

(72) Inventors: Kei Hirota, Okayama (JP); Kyohei Iwaoka, Kyoto (JP); Hitoshi Fukui, Nara (JP); Daisuke Usa, Osaka (JP); Kouta Muneyasu, Osaka (JP); Hiroki Nagayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/510,053

(22) Filed: Nov. 15, 2023

(65) Prior Publication Data

US 2024/0079184 A1    Mar. 7, 2024

Related U.S. Application Data

(63) Continuation of application No. 17/420,703, filed as application No. PCT/JP2020/002418 on Jan. 23, 2020, now Pat. No. 11,862,406.

(30) Foreign Application Priority Data

Jan. 24, 2019 (JP) .................................. 2019-010565
Feb. 27, 2019 (JP) .................................. 2019-034000

(51) Int. Cl.
*H01G 9/025* (2006.01)
*H01G 9/00* (2006.01)
(Continued)

(52) U.S. Cl.
CPC ........... *H01G 9/025* (2013.01); *H01G 9/0029* (2013.01); *H01G 9/012* (2013.01); *H01G 9/048* (2013.01); *H01G 9/10* (2013.01); *H01G 9/15* (2013.01)

(58) Field of Classification Search
None
See application file for complete search history.

(56) References Cited

U.S. PATENT DOCUMENTS 6,320,742 B1    11/2001 Wada et al.
11,862,406 B2 *    1/2024 Hirota ...................... H01G 9/15
(Continued)

FOREIGN PATENT DOCUMENTS

CN    1264137 A    8/2000
CN    1396609 A    2/2003
(Continued)

OTHER PUBLICATIONS

Translation JP 2006-156681A.*
(Continued)

*Primary Examiner* — Eric W Thomas
(74) *Attorney, Agent, or Firm* — Rimon P.C.

(57) ABSTRACT

A solid electrolytic capacitor includes a capacitor element. The capacitor element includes an anode foil including a base material part and a porous part disposed on a surface of the base material part, a dielectric layer disposed on at least a part of a surface of the anode foil, a solid electrolyte layer covering at least a part of the dielectric layer, and a cathode lead-out layer covering at least a part of the solid electrolyte layer. The anode foil includes an anode section on which the solid electrolyte layer is not disposed, a cathode formation section on which the solid electrolyte layer is disposed, and a separation section located between the anode section and the cathode formation section. A first insulating material is (Continued)

disposed on a surface of the porous part in the separation section. And at least a part of a region of the porous part that is covered with the first insulating material includes a second insulating material.

15 Claims, 14 Drawing Sheets

(51) Int. Cl.
*H01G 9/012* (2006.01)
*H01G 9/048* (2006.01)
*H01G 9/10* (2006.01)
*H01G 9/15* (2006.01)

(56) References Cited

U.S. PATENT DOCUMENTS

| | | |
|---|---|---|
| 2003/0007311 A1 | 1/2003 | Kojima et al. |
| 2004/0233615 A1 | 11/2004 | Sakai et al. |
| 2005/0162814 A1 | 7/2005 | Maruko et al. |
| 2006/0098394 A1 | 5/2006 | Sakai et al. |
| 2011/0026190 A1 | 2/2011 | Oohata |
| 2017/0247781 A1 | 8/2017 | Shinzato et al. |
| 2018/0233294 A1 | 8/2018 | Ishizaki et al. |
| 2019/0006109 A1 | 1/2019 | Shimamoto et al. |

FOREIGN PATENT DOCUMENTS

| | | |
|---|---|---|
| JP | 2003-007571 A | 1/2003 |
| JP | 2005-216929 A | 8/2005 |
| JP | 2006-156681 A | 6/2006 |
| JP | 2007-165777 A | 6/2007 |
| JP | 2007-305661 A | 11/2007 |
| JP | 2010-177467 A | 8/2010 |
| WO | 2000/067267 A1 | 11/2000 |
| WO | 2007/061005 A1 | 5/2007 |
| WO | 2017/073032 A1 | 5/2017 |
| WO | 2017/154374 A1 | 9/2017 |

OTHER PUBLICATIONS

Translation JP 2018-082082A.*
International Search Report of PCT application No. PCT/JP2020/002418 dated Apr. 14, 2020.
English Translation of Chinese Office Action dated Apr. 24, 2022 for the related Chinese Patent Application No. 202080010445.1.
Non-Final Office Action dated Apr. 6, 2023 issued in U.S. Appl. No. 17/420,703.
Notice of Allowance dated Aug. 16, 2023 issued in U.S. Appl. No. 17/420,703.

* cited by examiner

SOLID ELECTROLYTIC CAPACITOR AND METHOD FOR MANUFACTURING SAME

CROSS-REFERENCE TO RELATED APPLICATIONS

This application is a Continuation of U.S. patent application Ser. No. 17/420,703, filed on Jul. 5, 2021, now U.S. Pat. No. 11,862,406, which is the U.S. National Phase under 35 U.S.C. § of International Patent Application No. PCT/JP2020/002418, filed on Jan. 23, 2020, which claims priority to Japanese Patent Application No. 2019-010565, filed on Jan. 24, 2019, and Japanese Patent Application No. 2019-034000, filed on Feb. 27, 2019, the entire disclosures each of which are hereby incorporated by reference.

TECHNICAL FIELD

The present disclosure relates to a solid electrolytic capacitor and a method for manufacturing the same.

BACKGROUND

A solid electrolytic capacitor includes a capacitor element including a solid electrolyte layer, an electrode terminal electrically connected to the capacitor element, and an exterior body sealing the capacitor element. The capacitor element includes, for example, an anode foil having a porous part in a surface layer thereof, a dielectric layer disposed on at least a part of a surface of the anode foil, a solid electrolyte layer covering at least a part of the dielectric layer, and a cathode lead-out layer covering at least a part of the solid electrolyte layer.

Unexamined Japanese Patent Publication No. 2007-165777 proposes a solid electrolytic capacitor including a plurality of capacitor elements each including an anode part made of a valve metal with an oxide film layer disposed on a surface thereof, a cathode part including a solid electrolyte layer in a predetermined region of the surface, which has a layered shape including an outermost layer made of a conductive material, and a resist part electrically insulating the anode part and the cathode part.

International Publication WO 2007/061005 proposes a solid electrolytic capacitor including a shielding layer in a region separating an anode part region and a cathode part region of a substrate that has a porous layer thereon and is used for the solid electrolytic capacitor.

International Publication WO 2000/067267 proposes a method for manufacturing a solid electrolytic capacitor. The method includes a step of applying a masking material solution for forming a masking layer in a permeation part of a dielectric film into which the masking material solution penetrates.

Unexamined Japanese Patent Publication No. 2007-305661 proposes that a resist layer is provided on an etching layer formed on a surface of a valve metal for preventing penetration of a solid electrolyte material to separate an anode part and a cathode part. A first groove is formed in a region close to the cathode part, and a second groove is formed in a region closer to the anode part than the first groove. And the resist layer is formed in the second groove.

SUMMARY

In the solid electrolytic capacitor, air may enter through the porous part of the anode foil connected to the electrode terminal. When oxygen in the air having entered comes into contact with the solid electrolyte layer included in the capacitor element, the conductive polymer included in the solid electrolyte layer may be deteriorated under high temperature, and the capacitance of the solid electrolytic capacitor may be reduced.

A first aspect of the present disclosure relates to a solid electrolytic capacitor including a capacitor element. The capacitor element includes an anode foil including a base material part and a porous part disposed on a surface of the base material part, a dielectric layer disposed on at least a part of a surface of the anode foil, a solid electrolyte layer covering at least a part of the dielectric layer, and a cathode lead-out layer covering at least a part of the solid electrolyte layer. The anode foil includes an anode section on which the solid electrolyte layer is not disposed, a cathode formation section on which the solid electrolyte layer is disposed, and a separation section located between the anode section and the cathode formation section. A first insulating material is disposed on a surface of the porous part in the separation section. At least a part of a first region of the porous part, which is covered with the first insulating material, includes a second insulating material.

A second aspect of the present disclosure relates to a solid electrolytic capacitor including a capacitor element. The capacitor element includes an anode foil including a base material part and a porous part disposed on a surface of the base material part, a dielectric layer disposed on a surface of the anode foil, a solid electrolyte layer covering at least a part of the dielectric layer, and a cathode lead-out layer covering at least a part of the solid electrolyte layer. The anode foil includes an anode section on which the solid electrolyte layer is not disposed, a cathode formation section on which the solid electrolyte layer is disposed, and a separation section located between the anode section and the cathode formation section. A first insulating material is disposed on or included in at least a part of the separation section. The capacitor element further includes a second insulating material in at least a part of a region of the separation section, which is located closer to the anode section than the first insulating material.

A third aspect of the present disclosure relates to a solid electrolytic capacitor including a capacitor element. The capacitor element includes an anode foil including a base material part and a porous part disposed on a surface of the base material part, a dielectric layer disposed on a surface of the anode foil, a solid electrolyte layer covering at least a part of the dielectric layer, and a cathode lead-out layer covering at least a part of the solid electrolyte layer. The anode foil includes an anode section on which the solid electrolyte layer is not disposed, a cathode formation section on which the solid electrolyte layer is disposed, and a separation section located between the anode section and the cathode formation section. A first insulating material is disposed on or included in at least a part of the separation section. The solid electrolyte layer covers at least a part of a region of the separation section, which is located closer to the cathode formation section than the first insulating material.

A fourth aspect of the present disclosure relates to a solid electrolytic capacitor including a capacitor element. The capacitor element includes an anode foil including a base material part and a porous part disposed on a surface of the base material part, a dielectric layer disposed on a surface of the anode foil, a solid electrolyte layer covering at least a part of the dielectric layer, and a cathode lead-out layer covering at least a part of the solid electrolyte layer. The anode foil includes an anode section on which the solid electrolyte layer is not disposed, a cathode formation section on which the solid electrolyte layer is disposed, and a separation section located between the anode section and the cathode formation section. A first insulating material is disposed on or included in at least a part of the separation section. A second groove is formed to be adjacent to the first insulating material at a side close to the cathode formation section side in the separation section. The solid electrolyte layer is disposed in at least a part of the second groove.

A fifth aspect of the present disclosure relates to a solid electrolytic capacitor including a capacitor element. The capacitor element includes an anode foil including a base material part and a porous part disposed on a surface of the base material part, a dielectric layer disposed on a surface of the anode foil, a solid electrolyte layer covering at least a part of the dielectric layer, and a cathode lead-out layer covering at least a part of the solid electrolyte layer. The anode foil includes an anode section on which the solid electrolyte layer is not disposed, a cathode formation section on which the solid electrolyte layer is disposed, and a separation section located between the anode section and the cathode formation section. A first insulating material is disposed on or included in at least a part of the separation section. A third groove is formed in at least a part of the cathode formation section. The solid electrolyte layer is disposed in at least a part of the third groove.

A sixth aspect of the present disclosure relates to a solid electrolytic capacitor including a capacitor element. The capacitor element includes an anode foil including a base material part and a porous part disposed on a surface of the base material part, a dielectric layer disposed on a surface of the anode foil, a solid electrolyte layer covering at least a part of the dielectric layer, and a cathode lead-out layer covering at least a part of the solid electrolyte layer. The anode foil includes an anode section on which the solid electrolyte layer is not disposed, a cathode formation section on which the solid electrolyte layer is disposed, and a separation section located between the anode section and the cathode formation section. A first insulating material is disposed on or included in at least a part of the separation section. A second groove is formed to be adjacent to the first insulating material at a side close to the cathode formation section side in the separation section. A second insulating material is disposed in at least a part of the second groove.

A seventh aspect of the present disclosure relates to a method for manufacturing a solid electrolytic capacitor. The method includes:
(i) forming a dielectric layer on at least a part of a surface of an anode foil, the anode foil including a base material part and a porous part disposed on a surface of the base material part;
(ii) compressing or partially removing, after defining an anode section, a cathode formation section, and a separation section located between the anode section and the cathode formation section in the anode foil on which the dielectric layer is formed, the porous part in the separation section;
(iii) disposing a first insulating material on a surface of the separation section;
(iv) covering at least a part of the dielectric layer in the cathode formation section with a solid electrolyte layer;
(v) covering at least a part of the solid electrolyte layer with a cathode lead-out layer; and
(vi) after step (v), impregnating the porous part in at least a part of a region of the separation section with a second insulating material, the region of the separation section being covered with the first insulating material.

An eighth aspect of the present disclosure relates to a method for manufacturing a solid electrolytic capacitor. The method includes:
(i) forming a dielectric layer on at least a part of a surface of an anode foil, the anode foil including a base material part and a porous part disposed on a surface of the base material part;
(ii) conducting at least one of compression or removal of, after defining an anode section, a cathode formation section, and a separation section between the anode section and the cathode formation section in the anode foil on which the dielectric layer is formed, at least a part of the porous part in the separation section;
(iii) disposing a first insulating material in at least a part of the separation section or impregnating at least a part of the separation section with a first insulating material;
(iv) covering at least a part of the dielectric layer in the cathode formation section with a solid electrolyte layer;
(v) covering at least a part of the solid electrolyte layer with a cathode lead-out layer; and
(vi) after step (v), disposing a second insulating material in at least a part of a region of the separation section or impregnating the at least a part of the region of the separation section with the second insulating material, the region of the separation section being located closer to the anode section than the first insulating material.

According to the present disclosure, a decrease in capacitance of the solid electrolytic capacitor can be suppressed after being exposed to a high temperature environment.

DESCRIPTION OF EMBODIMENTS

Figure 1:
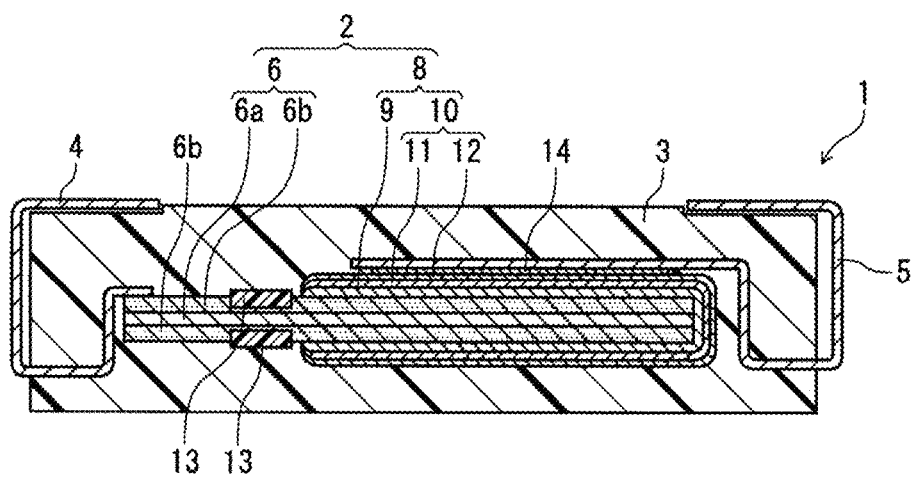
FIG. 1 is a cross-sectional view schematically illustrating a solid electrolytic capacitor according to a first exemplary embodiment of the present disclosure.

Novel features of the present disclosure are set forth in the appended claims. Meanwhile both construction and content of the present disclosure will be better understood by the following detailed description with the drawings, taken in conjunction with other objectives and features of the present disclosure.

An anode foil of a capacitor element includes a porous part disposed on a surface of a base material part. The porous part includes many voids. In the anode section of the anode foil on which the solid electrolyte layer is not disposed, the electrode terminal is connected. Air may enter into the capacitor element from the electrode terminal side through the voids of the porous part, and thus the conductive polymer included in the solid electrolyte layer may be deteriorated. Such deterioration of the conductive polymer is remarkable particularly in a high-temperature environment.

In the solid electrolytic capacitor according to the first aspect of the present disclosure, the separation section is disposed between the anode section and the cathode formation section in the anode foil of the capacitor element, and the first insulating material is disposed on a surface of the porous part in the separation section. Note that in the separation section, a region where the first insulating material is disposed is defined as a first region, a region between the first insulating material (or first region) and the cathode formation section is defined as a second region, and a region closer to the anode section than the first insulating material (or first region) is defined as a third region. In the solid electrolytic capacitor, at least a part of the first region of the porous part, which is covered with the first insulating material, includes the second insulating material. Since the porous part of the first region includes the second insulating material, entry of air through the first region into the capacitor element is suppressed.

The solid electrolytic capacitor according to the above aspect can be formed by impregnating voids of the porous part in the first region with the second insulating material after forming a capacitor element in which the first insulating material is disposed on a surface of the separation section. From the viewpoint of enhancing the effect of suppressing the entry of air, the porous part (more specifically, voids of porous part) of the first region may be filled with the second insulating material.

The solid electrolytic capacitor according to the second aspect of the present disclosure includes the separation section located between the anode section and the cathode formation section in the anode foil of the capacitor element. A first insulating material is disposed on or included in at least a part of the separation section. The capacitor element includes a second insulating material in at least a part of a region (third region) that is closer to the anode section than the first insulating material in the separation section. As a result, it is possible to suppress entry of air into the capacitor element from the anode section side.

The solid electrolytic capacitor according to the second aspect can be manufactured by compressing and/or removing at least a part of the porous part of the separation section, disposing the first insulating material in at least a part of the separation section or impregnating the at least a part of the separation section with the first insulating material, forming the solid electrolyte layer and the cathode lead-out layer, and then disposing the second insulating material in separation section or impregnating the separation section with the second insulating material. The second insulating material is disposed in or used to impregnate at least a part of the third region.

In the solid electrolytic capacitor according to the third aspect of the present disclosure, the first insulating material is disposed on or included in at least a part of the separation section, and at least a part of a region (i.e., second region of separation unit) of the separation section that is closer to the cathode formation section than the first insulating material (or first region) is covered with the solid electrolyte layer. Additionally, in the solid electrolytic capacitor according to the fourth aspect of the present disclosure, the first insulating material is disposed on or included in at least a part of the separation section, the second groove is formed to be adjacent to the first insulating material at a side close to the cathode formation section in the separation section, and the solid electrolyte layer is disposed in at least a part of the second groove. The second groove is formed in the second region. In these solid electrolytic capacitors, since the solid electrolyte layer is disposed in at least a part of the second region, entry of air through the second region is suppressed. From the viewpoint of enhancing the effect of suppressing the entry of air, the second groove may be filled with the solid electrolyte layer.

In the solid electrolytic capacitor according to the fifth aspect of the present disclosure, the first insulating material is disposed on or included in at least a part of the separation section, the third groove is formed in at least a part of the cathode formation section, and the solid electrolyte layer is disposed in at least a part of the third groove. In such a solid electrolytic capacitor, entry of air through a region located closer to the anode section than the third groove is suppressed. From the viewpoint of enhancing the effect of suppressing the entry of air, the third groove may be filled with the solid electrolyte layer.

In the solid electrolytic capacitor according to the sixth aspect of the present disclosure, the first insulating material is disposed on or included in at least a part of the separation section, the second groove is formed to be adjacent to the first insulating material at a side close to the cathode formation section in the separation section, and the second insulating material is disposed in at least a part of the second groove. The second groove is formed in the second region. In such a solid electrolytic capacitor, since the second insulating material is disposed in at least a part of the second region, entry of air through the second region is suppressed.

From the viewpoint of enhancing the effect of suppressing the entry of air, the second groove may be filled with the second insulating material.

As described above, with the solid electrolytic capacitors of these aspects, entry of air into the capacitor element is suppressed. This increases the effect of suppressing degradation of the conductive polymer included in the solid electrolyte layer even after the solid electrolytic capacitor is exposed to a high temperature environment. Hence, a decrease in capacitance after the heat resistance test can be suppressed. Additionally, since the heat resistance of the solid electrolyte layer is improved, an increase in equivalent series resistance (ESR) and dielectric loss tangent (tan δ) after the heat resistance test can be reduced.

Note that the phrase "the porous part, the separation section, the capacitor element, or the like includes the insulating material" is used in a broad sense including a case where the porous part, the separation section, or the capacitor element (more specifically, voids thereof) is impregnated with the insulating material and a case where the porous part, the separation section, or the capacitor element is filled with the insulating material.

Hereinafter, a solid electrolytic capacitor according to the above aspects of the present disclosure and a method for manufacturing the same will be described more specifically with reference to the drawings as necessary.

[Solid Electrolytic Capacitor]

(Capacitor Element)

A capacitor element included in a solid electrolytic capacitor includes an anode foil, a dielectric layer formed on at least a part of a surface of the anode foil, a solid electrolyte layer covering at least a part of the dielectric layer, and a cathode lead-out layer covering at least a part of the solid electrolyte layer. The anode foil includes a base material part and a porous part disposed on a surface of the base material part. Further, the anode foil is defined into a cathode formation section in which the solid electrolyte layer is formed, an anode section in which the solid electrolyte layer is not formed, and a separation section located between the anode section and the cathode formation section. The separation section may have, for example, a part (thin part) where the thickness of the porous part is small. The thin part is formed by compressing or partially removing the porous part. A part obtained by compressing the porous part may be referred to as a compressed part. A recess formed in the separation section by compressing and/or removing the porous part may be referred to as a groove. The groove may be formed on the base material part with the porous part interposed therebetween. Alternatively, the groove may be directly formed on the base material part without the porous part interposed therebetween. In a part where a groove is formed (or thin part), the passage of air is reduced as compared with other parts, and thus it is advantageous to provide the groove from the viewpoint of suppressing entry of air.

Figure 2:
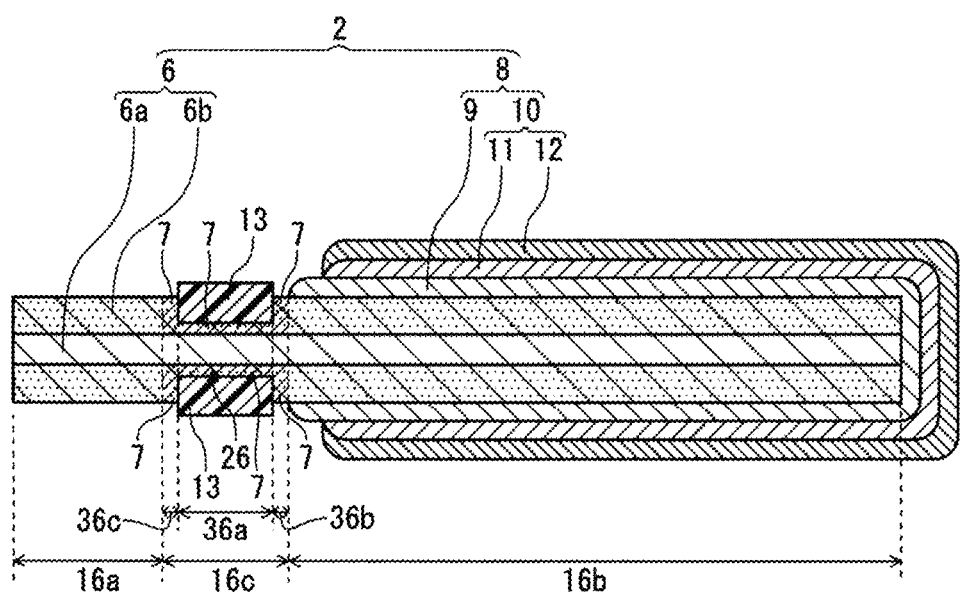
FIG. 2 is a cross-sectional view schematically illustrating a capacitor element included in the solid electrolytic capacitor of FIG. 1.

FIG. 1 is a cross-sectional view schematically illustrating a structure of a solid electrolytic capacitor according to a first exemplary embodiment of the present disclosure. FIG. 2 is an enlarged cross-sectional view schematically illustrating capacitor element 2 included in the solid electrolytic capacitor of FIG. 1.

Solid electrolytic capacitor 1 includes capacitor element 2, exterior body 3 that seals capacitor element 2, and anode lead terminal 4 and cathode lead terminal 5 each of which is at least partially exposed to the outside of exterior body 3. Exterior body 3 has a substantially rectangular parallelepiped outer shape, and solid electrolytic capacitor 1 also has a substantially rectangular parallelepiped outer shape.

Capacitor element 2 includes anode foil 6, a dielectric layer (not shown) covering a surface of anode foil 6, and cathode part 8 covering the dielectric layer. The dielectric layer is formed, at minimum, on at least a part of the surface of anode foil 6.

Cathode part 8 includes solid electrolyte layer 9 and cathode lead-out layer 10. Solid electrolyte layer 9 is formed so as to cover at least a part of the dielectric layer. Cathode lead-out layer 10 is formed so as to cover at least a part of solid electrolyte layer 9. Cathode lead-out layer 10 has carbon layer 11 and metal paste layer 12. Cathode lead terminal 5 is electrically connected to cathode part 8 via adhesive layer 14 made of a conductive adhesive.

Anode foil 6 includes base material part 6a and porous part 6b formed on a surface of base material part 6a. Anode foil 6 has anode section 16a on which solid electrolyte layer 9 is not formed, cathode formation section 16b on which solid electrolyte layer 9 (or cathode part 8) is formed, and separation section 16c located between anode section 16a and cathode formation section 16b. Anode lead terminal 4 is electrically connected to anode section 16a of anode foil 6 by welding.

First insulating material 13 is disposed on a surface of porous part 6b in separation section 16c. First insulating material 13 restricts (electrical) contact between anode section 16a and cathode part 8 by preventing the conductive polymer from creeping toward anode section 16a when solid electrolyte layer 9 is formed. In the illustrated example, separation section 16c has thin part 26, and first insulating material 13 is disposed on thin part 26. First insulating material 13 may be disposed on at least a part of thin part 26. Note that separation section 16c does not necessarily have to have thin part 26.

In the present exemplary embodiment, at least a part of a region of porous part 6b of first region 36a covered with first insulating material 13 includes second insulating material 7. More specifically, porous part 6b of first region 36a includes second insulating material 7. Porous part 6b includes voids. Hence, porous part 6b includes second insulating material 7 in a state where the voids are impregnated with second insulating material 7. Since porous part 6b of first region 36a includes second insulating material 7, entry of air into the capacitor element through first region 36a is suppressed. As a result, deterioration of the conductive polymer included in solid electrolyte layer 9 due to oxygen is suppressed, so that heat resistance of solid electrolyte layer 9 can be enhanced. A decrease in capacitance of the solid electrolytic capacitor after the heat resistance test can be suppressed. Additionally, an increase of ESR and a dielectric loss tangent after the heat resistance test can be reduced.

Second insulating material 7 is included, at minimum, in at least porous part 6b of first region 36a. Second insulating material 7 may also be included at least around first region 36a. In this case, entry of air into capacitor element 2 through porous part 6b around first region 36a is suppressed. Further, second insulating material 7 may be included in at least a part of cathode lead-out layer 10. From this, it is possible to suppress entry of air into capacitor element 2 through cathode lead-out layer 10.

For example, second insulating material 7 may be included in porous part 6b between first insulating material 13 and cathode lead-out layer 10 (in other words, porous part 6b of second region 36b located between first insulating material 13 of porous part 6b and cathode lead-out layer 10). Further, second insulating material 7 may be included in porous part 6b of a region located closer to anode section 16a than first insulating material 13 (in other words, porous part 6b of third region 36c located closer to anode section 16a than first insulating material 13 of porous part 6b). In this case, depending on the position of first insulating material 13, the part including second insulating material 7 may be located in porous part 6b of any of anode section 16a or porous part 6b of separation section 16c.

Second insulating material 7 may be included at these positions in an impregnated state or in a filled state.

Figure 3:
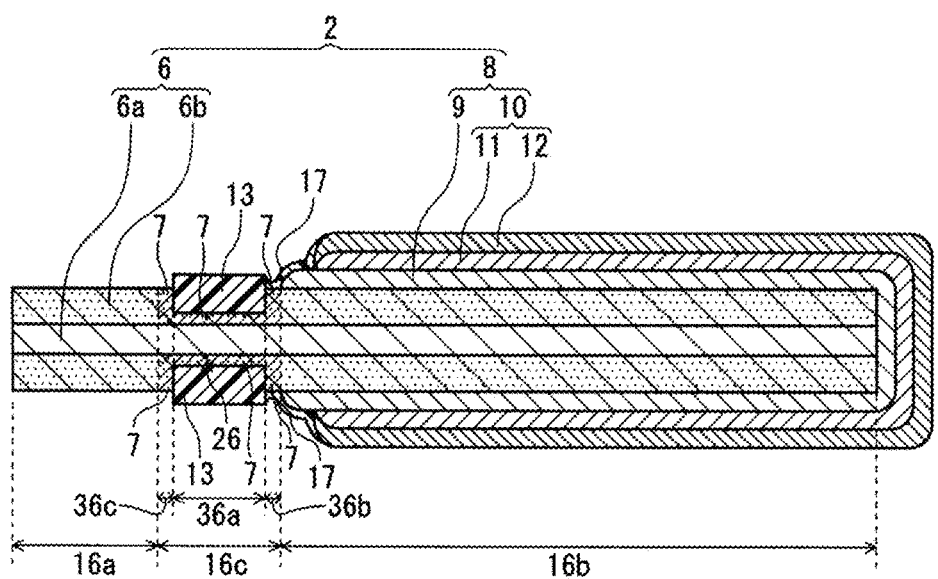
FIG. 3 is a cross-sectional view schematically illustrating a capacitor element included in a solid electrolytic capacitor according to a second exemplary embodiment of the present disclosure.

FIG. 3 is a cross-sectional view schematically illustrating capacitor element 2 included in a solid electrolytic capacitor according to a second exemplary embodiment. Since cathode part 8 of capacitor element 2 includes a plurality of layers and has a thickness to some extent, a recess (neck) is formed between cathode part 8 and separation section 16c (or first insulating material 13). As shown in FIG. 3, a surface of the recess (neck) may be covered with third insulating material 17. At least a part of the surface of the recess, at minimum, is covered with third insulating material 17, and the recess may be filled with third insulating material 17. Third insulating material 17 may adhere to at least the periphery of first region 36a. Further, third insulating material 17 may cover at least a part of at least one of cathode lead-out layer 10 or solid electrolyte layer 9. For example, as shown in FIG. 3, an end of cathode lead-out layer 10 or an end of solid electrolyte layer 9 at a side close to anode section 16a and its periphery may be covered with third insulating material 17. Third insulating material 17 may cover at least a part of a surface of solid electrolyte layer 9 that is not covered with cathode lead-out layer 10. For example, near the end of cathode lead-out layer 10 at a side close to anode section 16a, there is a part where solid electrolyte layer 9 is not covered with cathode lead-out layer 10. In such a case, at least a part of solid electrolyte layer 9 may be covered with third insulating material 17 disposed between first insulating material 13 (or first region 36a) and the end of cathode lead-out layer 10 at a side close to anode section 16a. In the case of FIG. 3, as the same in the case of FIGS. 1 and 2, second insulating material is included in porous part 6b of first region 36a, second region 36b, and third region 36c. Capacitor element 2 in FIG. 3 is the same as capacitor element 2 in FIG. 2 except that at least a part of the recess (neck) and the end of cathode lead-out layer 10 and/or solid electrolyte layer 9 at a side close to anode section 16a and its periphery is covered with third insulating material 17. Hence, the description of FIGS. 1 and 2 can be referred to.

Note that although not shown, at least a part of porous part 6b that is located closer to anode section 16a than first insulating material 13 may be covered with third insulating material 17.

Figure 4:
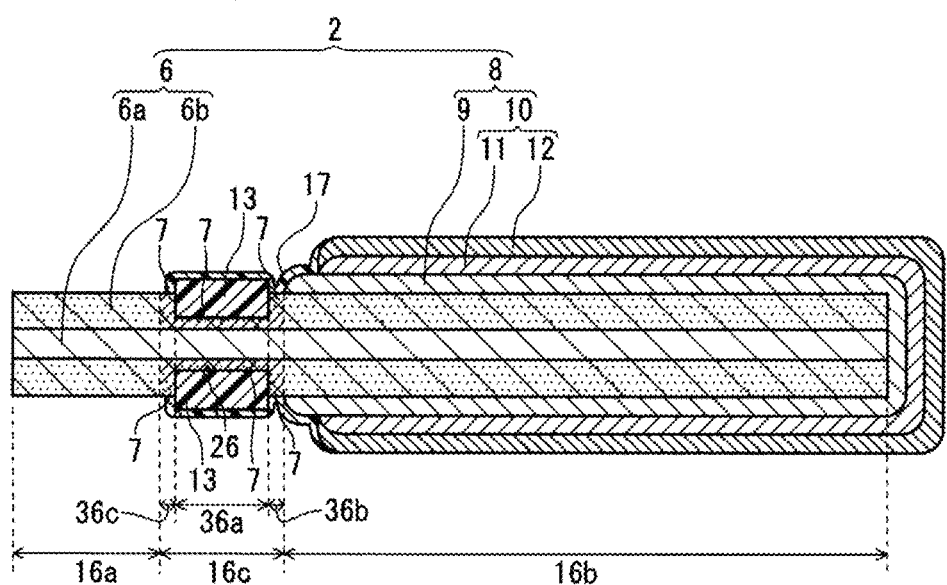
FIG. 4 is a cross-sectional view schematically illustrating a capacitor element included in a solid electrolytic capacitor according to a third exemplary embodiment of the present disclosure.

FIG. 4 is an enlarged cross-sectional view schematically illustrating capacitor element 2 included in a solid electrolytic capacitor according to a third exemplary embodiment.

In FIG. 4, third insulating material 17 covers a surface of first insulating material 13, a surface of porous part 6b between first insulating material 13 and the end of cathode lead-out layer 10 at a side close to anode section 16a, and a surface of porous part 6b located next to first insulating material 13 at a side close to on anode section 16a. Further, a second insulating material is also included in porous part 6b of second region 36b and third region 36c.

Since metal paste layer 12 is not dense, voids exist in metal paste layer 12. Hence, when an insulating material is supplied to a surface of cathode lead-out layer 10, metal paste layer 12 is impregnated with the insulating material. The impregnated insulating material corresponds to second insulating material 7. In FIG. 4, entirety of metal paste layer 12 is impregnated with second insulating material 7. Note that second insulating material 7 does not necessarily have to be included in the entirety of metal paste layer 12, and is included, at minimum, in at least a part of metal paste layer 12. When metal paste layer 12 includes second insulating material, it is possible to suppress entry of air into capacitor element 2 through metal paste layer 12, and it is possible to suppress a decrease in heat resistance of solid electrolyte layer 9 even more. Further, an insulating material may be attached to the surface of cathode lead-out layer 10. The insulating material covering at least a part of cathode lead-out layer 10 corresponds to third insulating material 17.

The second insulating material supplied from at least one of separation section 16c, anode section 16a, and cathode lead-out layer 10 penetrates into porous part 6b, so that porous part 6b in at least one of first region 36a, second region 36b, third region 36c, and cathode formation section 16b is impregnated or filled with the second insulating material. The second insulating material supplied to the surface of cathode lead-out layer 10 may penetrate into cathode lead-out layer 10, solid electrolyte layer 9, and the like to impregnate or fill porous part 6b in cathode formation section 16b.

Figure 5:
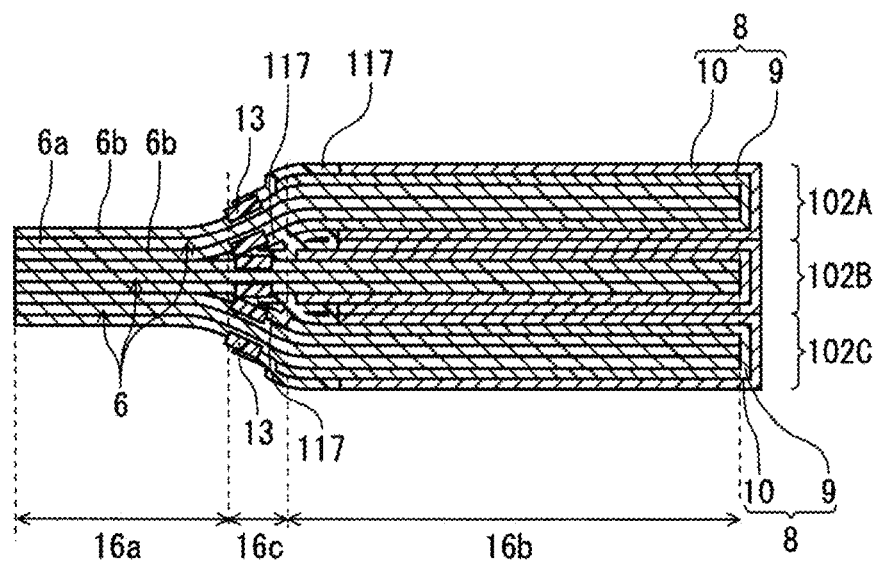
FIG. 5 is a cross-sectional view schematically illustrating a capacitor element included in a solid electrolytic capacitor according to a fourth exemplary embodiment of the present disclosure.

FIG. 5 is a cross-sectional view schematically illustrating a capacitor element included in a solid electrolytic capacitor according to a fourth exemplary embodiment. In FIG. 5, three capacitor elements 102A, 102B, and 102C are laminated. In FIG. 5, only the laminated body part of these capacitor elements is illustrated for the sake of convenience. The configuration of FIG. 5 is different from the configurations of FIGS. 2 to 4 in that three capacitor elements are laminated and the region covered with an insulating material is different. However, the description of FIGS. 1 to 4 can be referred to for the rest of the configuration.

In FIG. 5, each of capacitor elements 102A, 102B, and 102C includes anode foil 6, a dielectric layer covering anode foil 6, solid electrolyte layer 9 covering the dielectric layer, and cathode lead-out layer 10 covering solid electrolyte layer 9, as the same in the case of FIG. 2. Anode foil 6 is defined into anode section 16a, cathode formation section 16b, and separation section 16c therebetween. First insulating material 13 is disposed on porous part 6b of separation section 16c.

Fourth insulating material 117 covers a part of a surface of the laminated body of capacitor elements 102A, 102B, and 102C. More specifically, fourth insulating material 117 covers a part of a surface of first insulating material 13, porous part 6b between first insulating material 13 and the end of solid electrolyte layer 9 at a side close to anode section 16a, and a part of a surface of solid electrolyte layer 9. Fourth insulating material 117 may cover at least a part of cathode lead-out layer 10. Fourth insulating material 117 may cover at least a part of the laminated body. Even in the case of the laminated body of the capacitor elements, at least a part of the surface is covered with fourth insulating material 117, so that entry of air into each capacitor element is suppressed, and a decrease in heat resistance of solid electrolyte layer 9 can be suppressed. Further, after the laminated body of the capacitor elements is connected to a lead frame, at least a part of surfaces of the laminated body and the lead frame may be covered with fourth insulating material 117. The position of fourth insulating material 117 in the laminated body is not limited to these cases. For example, in the laminated body, at least one of a part between adjacent capacitor elements, between first insulating materials 13 of adjacent capacitor elements, between third insulating materials 17 of adjacent capacitor elements, and the entire surface of the laminated body may be covered with fourth insulating material 117.

In the laminated body, at least a part of cathode lead-out layer 10 (e.g., silver paste layer) may include a second insulating material. By supplying the insulating material to the surface of the laminated body, the insulating material penetrates into porous part 6b, and the first region, the second region, porous part 6b of cathode formation section 16b, and the like are also impregnated or filled with the insulating material. The impregnated or filled insulating material corresponds to the second insulating material. Further, in the laminated body, at least a part of the periphery of at least first region 36a, cathode lead-out layer 10, solid electrolyte layer 9, and the like may be covered with an insulating material (corresponding to third insulating material).

Although the following exemplary embodiments shown in FIGS. 6 to 14 are different from FIGS. 2 to 4 in that a groove part is formed in an anode section, or a position of an insulating material, a region covered by a solid electrolyte layer, or the like is different, the description of FIGS. 1 to 4 can be referred to for the rest of the configuration. In these exemplary embodiments, as the same in the case of FIGS. 2 to 4, first insulating material 13 is disposed on a surface of porous part 6b (more specifically, thin part 26). Meanwhile, the present invention is not limited to such a case. First insulating material 13 may be disposed on at least a part of separation section 16c or may be included in at least a part of separation section 16c. First insulating material 13 may be disposed on at least a part of thin part 26. Further, separation section 16c does not necessarily have to have thin part 26. First insulating material 13 does not necessarily have to be disposed on the surface of porous part 6b, and may be disposed directly on base material part 6a without interposing porous part 6b. Note that the capacitor elements shown in these exemplary embodiments may be used as the capacitor elements forming the laminated body of FIG. 5.

Figure 6:
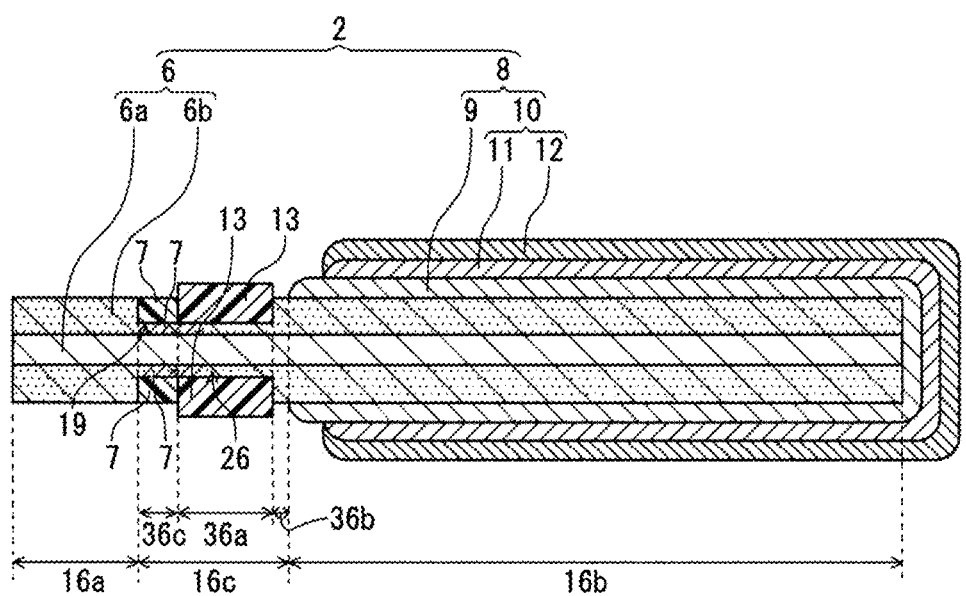
FIG. 6 is a cross-sectional view schematically illustrating a capacitor element included in a solid electrolytic capacitor according to a fifth exemplary embodiment of the present disclosure.

FIG. 6 is an enlarged cross-sectional view schematically illustrating capacitor element 2 included in a solid electrolytic capacitor according to a fifth exemplary embodiment. In the present exemplary embodiment, in separation section 16c, second insulating material 7 is included in at least a part of third region 36c that is located closer to anode section 16a than first region 36a where first insulating material 13 is disposed. Since second insulating material 7 is included in third region 36c, entry of air into capacitor element 2 from anode section 16a is suppressed. Second insulating material 7 may be disposed in third region 36c, and at least a part of third region 36c may be impregnated or filled with second insulating material 7.

In the illustrated example, thin part 26 is formed in third region 36c as well, whereby groove (first groove) 19 is formed adjacent to first insulating material 13. First groove 19 is filled with second insulating material 7. Since second insulating material 7 is included in first groove 19 as described above, entry of air into capacitor element 2 through porous part 6b in third region 36c is suppressed even more.

Second insulating material 7 does not necessarily have to be included so as to fill the entire first groove 19 as shown in FIG. 6, and second insulating material 7 is disposed, at minimum, in at least a part of first groove 19. For example, second insulating material 7 may be disposed so as to cover at least a part of first groove 19. Alternatively, first groove 19 may be impregnated with second insulating material 7. For example, second insulating material 7 may be filled so as to partially fill first groove 19, or second insulating material 7 may be disposed on at least a part of an inner surface of first groove 19.

Porous part 6b around first groove 19 may include second insulating material 7 in an impregnated (or filled) state. It is possible to suppress entry of air into capacitor element 2 through porous part 6b around first groove 19. For example, in third region 36c, porous part 6b existing below first groove 19 may include second insulating material 7 in an impregnated (or filled) state. Further, at least a part (such as a part close to third region 36c) of porous part 6b in first region 36a may include second insulating material 7 in an impregnated (or filled) state.

Further, at least a part of cathode lead-out layer 10 may include second insulating material 7 in an impregnated or filled state. Although not shown, at least a part of cathode lead-out layer 10 may be covered with third insulating material 17. In at least one of these cases, entry of air into capacitor element 2 from cathode lead-out layer 10 can be suppressed.

For example, porous part 6b between first insulating material 13 and cathode lead-out layer 10 (in other words, second region 36b between first insulating material 13 of porous part 6b and cathode lead-out layer 10) may include second insulating material 7 in an impregnated or filled state. Further, porous part 6b of a part of anode section 16a adjacent to separation section 16c may include second insulating material 7 in an impregnated or filled state.

In the case of FIG. 6, a surface of a recess (neck) may also be covered with third insulating material 17 as the same in the case of FIG. 3. Further, third insulating material 17 may adhere to at least the periphery of first region 36a. Third insulating material 17 may cover at least a part of at least one of cathode lead-out layer 10 or solid electrolyte layer 9. The position of third insulating material 17 can be referred to in the description of FIG. 3 or 4. At least a part of a surface of first insulating material 13 may be covered with third insulating material 17.

Figure 7:
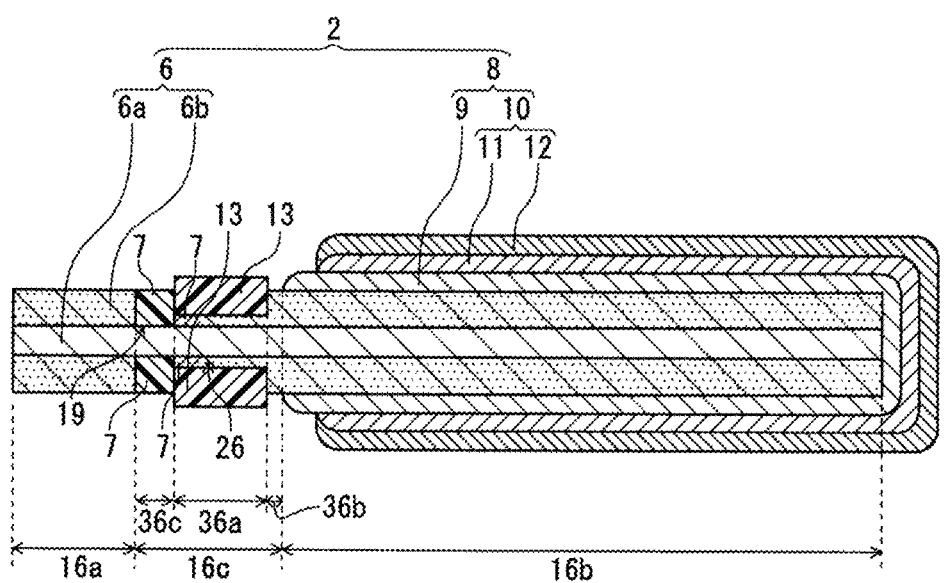
FIG. 7 is a cross-sectional view schematically illustrating a capacitor element included in a solid electrolytic capacitor according to a sixth exemplary embodiment of the present disclosure.

FIG. 7 is a cross-sectional view schematically illustrating capacitor element 2 included in a solid electrolytic capacitor according to a sixth exemplary embodiment.

In FIG. 7, first groove 19 is formed by removing porous part 6b in third region 36c. That is, there is no porous part 6b below first groove 19. Meanwhile, the rest of the configuration is the same as in FIG. 6, and the description of FIGS. 1 and 6 can be referred to. In the case of FIG. 7, second insulating material 7 is included in first groove 19 as the same in the case of FIG. 6. Hence, entry of air can be suppressed. Alternatively, at least a part of porous part 6b in first region 36a may include second insulating material 7 in an impregnated (or filled) state.

Figure 8:
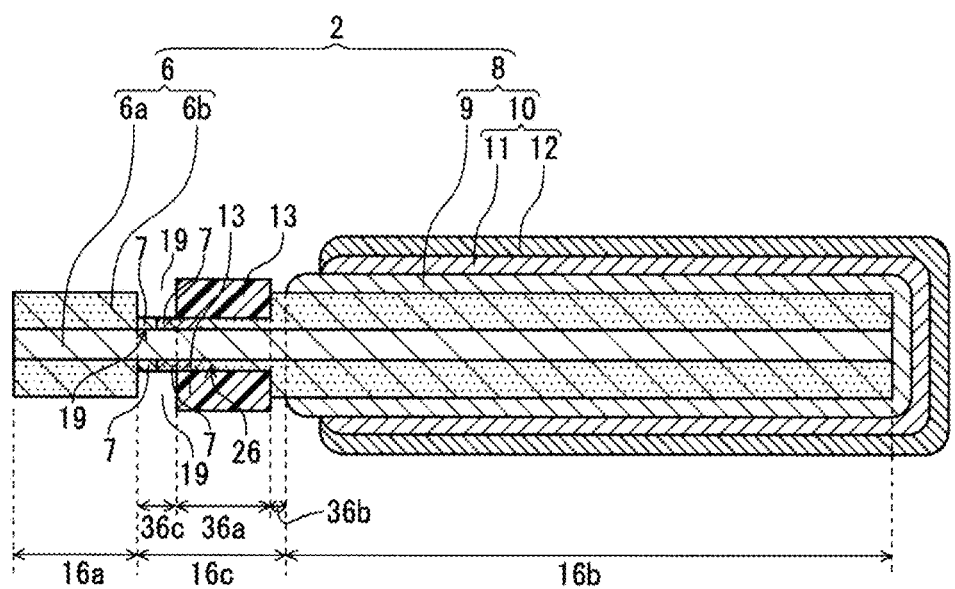
FIG. 8 is a cross-sectional view schematically illustrating a capacitor element included in a solid electrolytic capacitor according to a seventh exemplary embodiment of the present disclosure.
Figure 9:
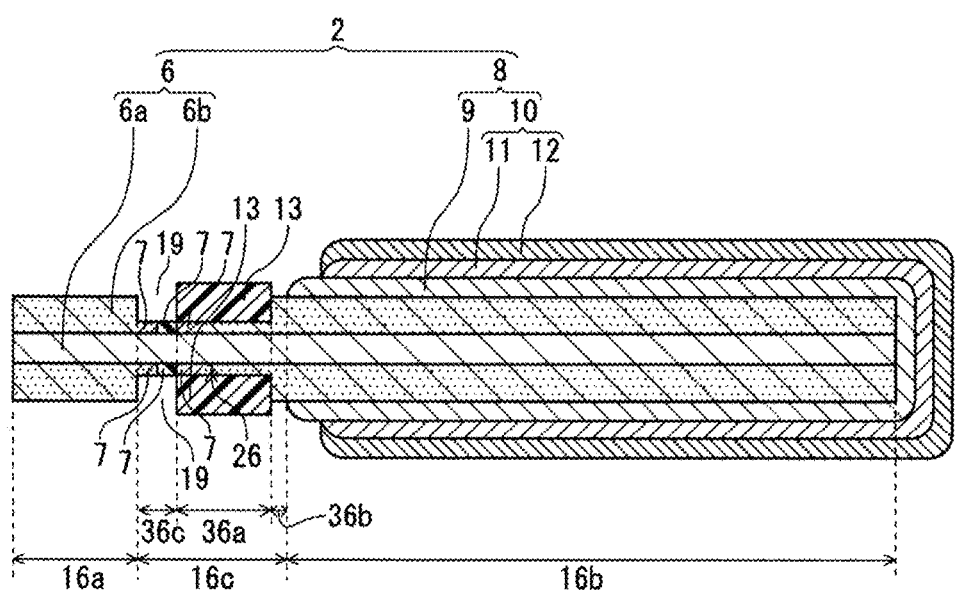
FIG. 9 is a cross-sectional view schematically illustrating a capacitor element included in a solid electrolytic capacitor according to an eighth exemplary embodiment of the present disclosure.

FIG. 8 is a cross-sectional view schematically illustrating capacitor element 2 included in a solid electrolytic capacitor according to a seventh exemplary embodiment. FIG. 9 is a cross-sectional view schematically illustrating capacitor element 2 included in a solid electrolytic capacitor according to an eighth exemplary embodiment. These drawings show an example of a case where porous part 6b exists in a part below first groove 19. These exemplary embodiments are the same as FIG. 6 except that the structure of first groove 19 is different, and the description of FIGS. 1 and 6 can be referred to.

In FIG. 8, in a part of third region 36c which is close to first region 36a, porous part 6b exists below first groove 19. In the remaining part of third region 36c which is close to anode section 16a, porous part 6b does not exist below first groove 19. A recess which is close to anode section 16a is formed at a bottom part of first groove 19. Since the recess is filled with second insulating material 7, entry of air can be suppressed. Porous part 6b below first groove 19 may be impregnated (or filled) with second insulating material in a part of third region 36c which is close to first region 36a.

In FIG. 9, porous part 6b exists below first groove 19 in a part of third region 36c which is close to anode section 16a, and porous part 6b does not exist below first groove 19 in the remaining part of third region 36c which is close to first region 36a. In a bottom part of first groove 19, a recess which is close to first region 36a is formed because porous part 6b does not exist. That is, only the position of porous part 6b (or recess) below first groove 19 is different from that in FIG. 8, and the rest of the configuration is the same as in FIG. 8. The recess which is close to first region 36a is filled with second insulating material 7, so that entry of air can be suppressed. Porous part 6b below first groove 19 in a part of third region 36c which is close to anode section 16a may include second insulating material 7 in an impregnated (or filled) state.

While these drawings show a state in which the recess of the bottom part of first groove 19 is filled with second insulating material 7, the present invention is not limited to this case. For example, at least a part of first groove 19 may be covered with second insulating material 7. At least a part of first groove 19 may be impregnated or filled with second insulating material 7, or the entirety of first groove 19 may be filled with second insulating material 7.

While FIGS. 6 to 9 show the case where first groove 19 is formed at a position adjacent to first insulating material 13, the present invention is not particularly limited to this case. First groove 19 may be formed to be apart from first insulating material 13. An example of this case is shown in FIG. 10.

Figure 10:
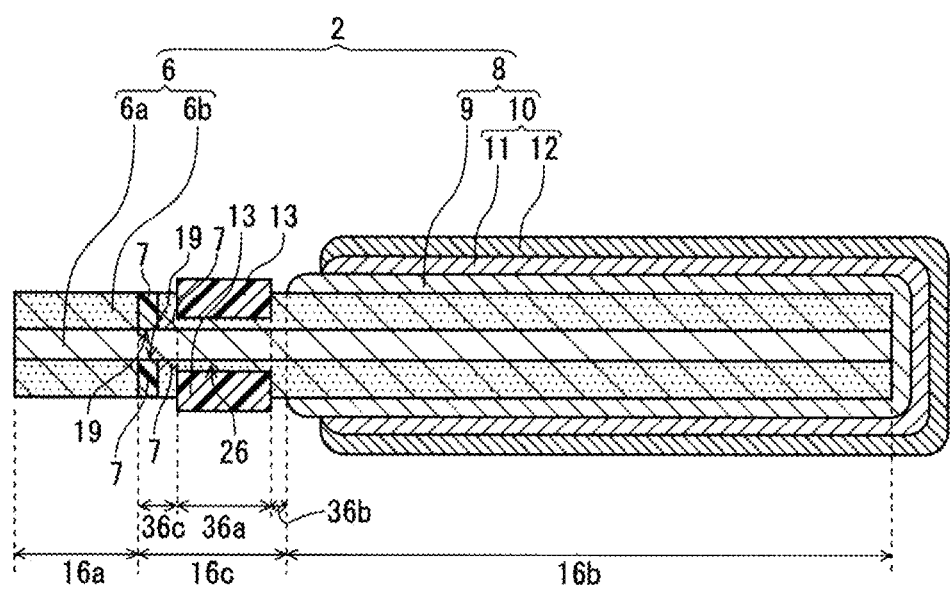
FIG. 10 is a cross-sectional view schematically illustrating a capacitor element included in a solid electrolytic capacitor according to a ninth exemplary embodiment of the present disclosure.

FIG. 10 is a cross-sectional view schematically illustrating capacitor element 2 included in a solid electrolytic capacitor according to a ninth exemplary embodiment.

In FIG. 10, first groove 19 is formed to be apart from first insulating material 13. First groove 19 is filled with second insulating material 7, whereby entry of air is suppressed. While porous part 6b exists in a part of third region 36c which is close to first region 36a, this part may include second insulating material 7 in an impregnated (or filled) state. Although porous part 6b does not exist below first groove 19, the present invention is not limited to this case, and porous part 6b may be provided below first groove 19. Porous part 6b below first groove 19 may include the second insulating material in an impregnated (or filled) state. The rest of the configuration is the same as in FIG. 6, and the description of FIGS. 1 and 6 can be referred to.

Figure 11:
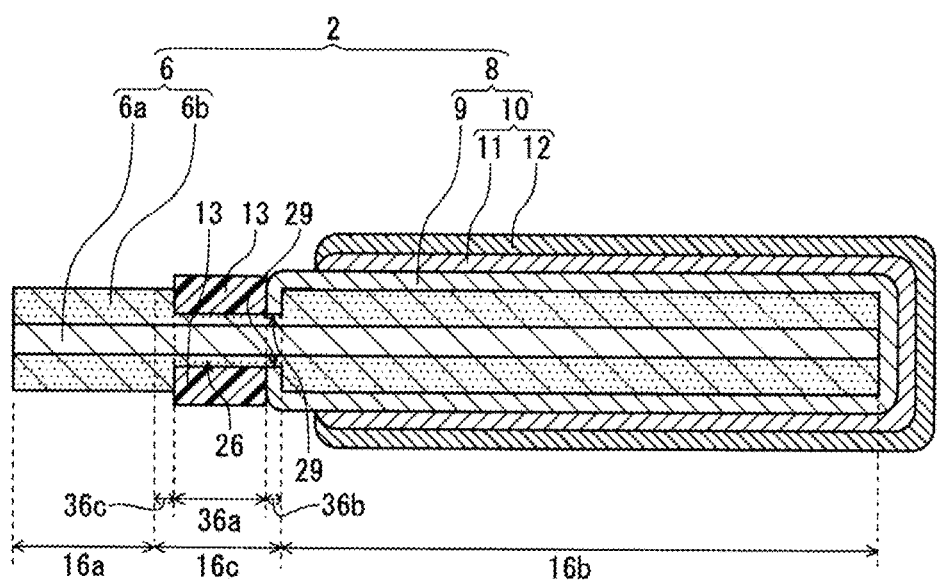
FIG. 11 is a cross-sectional view schematically illustrating a capacitor element included in a solid electrolytic capacitor according to a tenth exemplary embodiment of the present disclosure.
Figure 12:
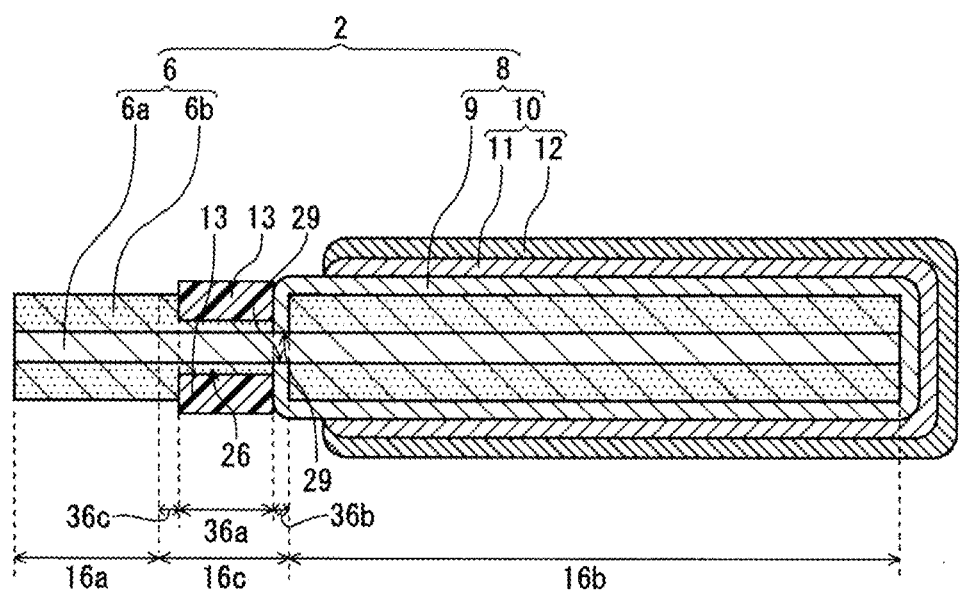
FIG. 12 is a cross-sectional view schematically illustrating a capacitor element included in a solid electrolytic capacitor according to an eleventh exemplary embodiment of the present disclosure.

FIG. 11 is a cross-sectional view schematically illustrating capacitor element 2 included in a solid electrolytic capacitor according to a tenth exemplary embodiment. FIG. 12 is a cross-sectional view schematically illustrating capacitor element 2 included in a solid electrolytic capacitor according to an eleventh exemplary embodiment. These drawings show an example of a state in which solid electrolyte layer 9 is disposed in at least a part of a region (i.e., second region 36b) in separation section 16c which is closer to cathode formation section 16b than first insulating material 13. By disposing solid electrolyte layer 9 in at least a part of second region 36b in separation section 16c, entry of air into second region 36b is suppressed.

In FIG. 11, thin part 26 is formed in separation section 16c, and first insulating material 13 is disposed on a surface of a part of thin part 26 which is close to anode section 16a. In second region 36b, second groove 29 is formed adjacent to first insulating material 13. Solid electrolyte layer 9 is formed so as to enter into second groove 29, so that solid electrolyte layer 9 is disposed in at least a part of second region 36b.

FIG. 12 is different from FIG. 11 in that, in second region 36b, second groove 29 is formed by removing porous part 6b, and porous part 6b does not exist below second groove 29. Meanwhile, the rest of the configuration is the same as in FIG. 11, and the description of FIG. 11 can be referred to.

Solid electrolyte layer 9 is disposed, at minimum, in at least a part of second region 36b. For example, solid electrolyte layer 9 may enter into at least a part of second groove 29. Further, solid electrolyte layer 9 may be disposed so as to cover at least a part of second groove 29. From the viewpoint of enhancing the effect of suppressing entry of air, it is preferable that solid electrolyte layer 9 enters into the entirety of second groove 29 (in other words, second groove 29 is filled with solid electrolyte layer 9).

In FIGS. 11 and 12, although not shown, second insulating material 7 may also be disposed in at least a part of second groove 29. In this case, the leakage current of the solid electrolytic capacitor can be suppressed even more.

Figure 13:
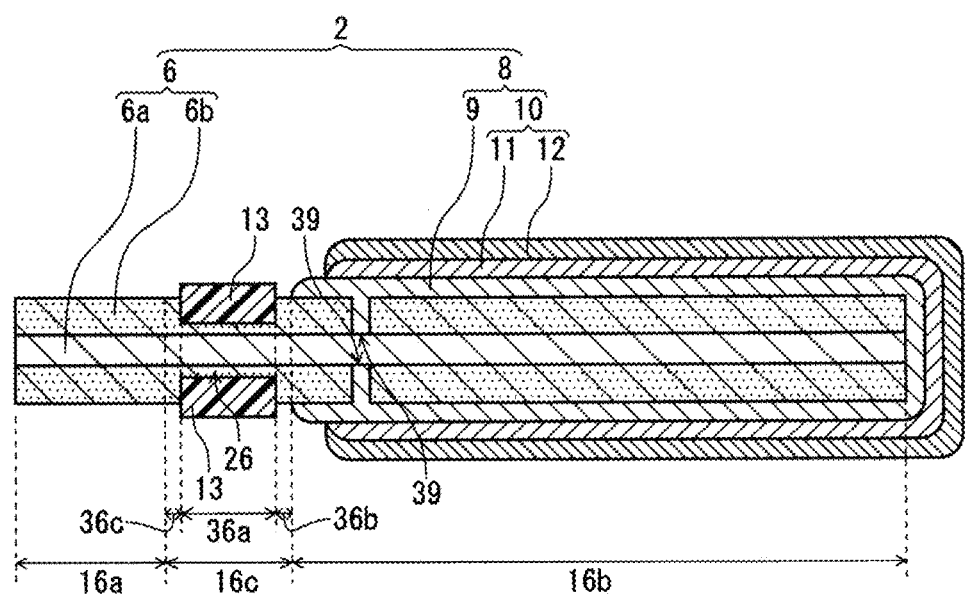
FIG. 13 is a cross-sectional view schematically illustrating a capacitor element included in a solid electrolytic capacitor according to a twelfth exemplary embodiment of the present disclosure.

FIG. 13 is a cross-sectional view schematically illustrating capacitor element 2 included in a solid electrolytic capacitor according to a twelfth exemplary embodiment. In FIG. 13, thin part 26 is formed in separation section 16c, and first insulating material 13 is disposed on a surface of thin part 26. In the illustrated example, a groove (third groove 39) is formed by removing porous part 6b in at least a part of cathode formation section 16b. When solid electrolyte layer 9 is formed so as to enter into third groove 39, solid electrolyte layer 9 is disposed in at least a part of third groove 39.

Solid electrolyte layer 9 may enter into at least a part of third groove 39, or may be disposed so as to cover at least a part of third groove 39. From the viewpoint of enhancing the effect of suppressing entry of air, it is preferable that at least the entire surface of porous part 6b around third groove 39 (in other words, entire inner wall of third groove 39) be covered with solid electrolyte layer 9. From the same viewpoint, it is more preferable that solid electrolyte layer 9 enters into the entirety of third groove 39 (in other words, third groove 39 is filled with solid electrolyte layer 9). Further, by filling third groove 39 with solid electrolyte layer 9, an effective area of solid electrolyte layer 9 can be increased.

The shape of third groove 39 is not particularly limited, but may be a columnar shape (e.g., cylindrical shape or prismatic shape) or a shape in which the diameter decreases from the surface of porous part 6b toward base material part 6a (e.g., tapered cross section). In third groove 39, it is preferable that solid electrolyte layer 9 enters into a part having a small diameter as well, and solid electrolyte layer 9 be disposed therein.

From the viewpoint of easily securing a higher effect for suppressing entry of air into capacitor element 2, it is preferable that third groove 39 be formed at a position closer to separation section 16c in the length direction of cathode formation section 16b. For example, when the length of cathode formation section 16b is L, it is preferable to form third groove 39 in a region ranging from the boundary of separation section 16c and cathode formation section 16b to a position of length 0.3 L (preferably 0.25 L) from the boundary.

Third groove 39 may be formed in the entire region ranging from the boundary of separation section 16c and cathode formation section 16b to the position of length 0.3 L (preferably 0.25 L) from this boundary, or may be formed in a part of this region. Third groove 39 may be formed as a single groove extending over the entire region. In cathode formation section 16b, single third groove 39 may be formed, or a plurality of third grooves 39 may be formed. The width of third groove 39 is, for example, equal to or more than 0.01 µm. The width of third groove 39 may be equal to or more than 0.1 µm, equal to or more than 1 µm, or equal to or more than 5 µm. The width of the third groove 39 is preferably equal to or less than 0.3 L or equal to or less than 0.25 L, and may be equal to or less than 50 µm or equal to or less than 30 µm. The lower limit value and the upper limit value can be arbitrarily combined. Note that the width of third groove 39 is a length of third groove 39 in a direction along the length direction of cathode formation section 16b.

Although porous part 6b does not exist below third groove 39 in the illustrated example, the present invention is not limited to this case, and porous part 6b may be provided below third groove 39. From the viewpoint of enhancing the effect of suppressing entry of air, the thickness of porous part 6b below third groove 39 is preferably small. For example, when the thickness of porous part 6b is T, the depth of third groove 39 is preferably equal to or more than 0.95T, and may be equal to or more than 0.98T. The depth of third groove 39 is equal to or less than T, for example. From the viewpoint of enhancing the effect of suppressing entry of air even more, it is preferable that porous part 6b do not exist below third groove 39.

Although FIG. 13 shows an example in which third groove 39 is formed at a position away from separation section 16c, the present invention is not limited to this case. Third groove 39 may be formed at a position in cathode formation section 16b adjacent to separation section 16c.

In the tenth exemplary embodiment, the eleventh exemplary embodiment, and the twelfth exemplary embodiment, separation section 16c does not need to include second insulating material 7 unlike in the fifth to ninth exemplary embodiments. Meanwhile, the present invention is not limited to this case, and separation section 16c may include second insulating material 7 as shown in the fifth to ninth exemplary embodiments. In FIGS. 11 to 13, the states of second region 36b and third region 36c are different from those in FIG. 6, but the rest of the configuration is the same as in FIG. 6. Hence, the description of FIGS. 1 and 6 can be referred to. In the twelfth exemplary embodiment, second groove 29 may also be formed, and solid electrolyte layer 9 may enter into second groove 29 as in the tenth exemplary embodiment or the eleventh exemplary embodiment. Further, second insulating material 7 may also be disposed in at least a part of second groove 29. Note that in the first to ninth exemplary embodiments, second groove 29 and/or third groove 39 may be formed, and solid electrolyte layer 9 may enter into these grooves as shown in the tenth exemplary embodiment, the eleventh exemplary embodiment, or the twelfth exemplary embodiment. Further, second insulating material 7 may also be disposed in at least a part of second groove 29.

Figure 14:
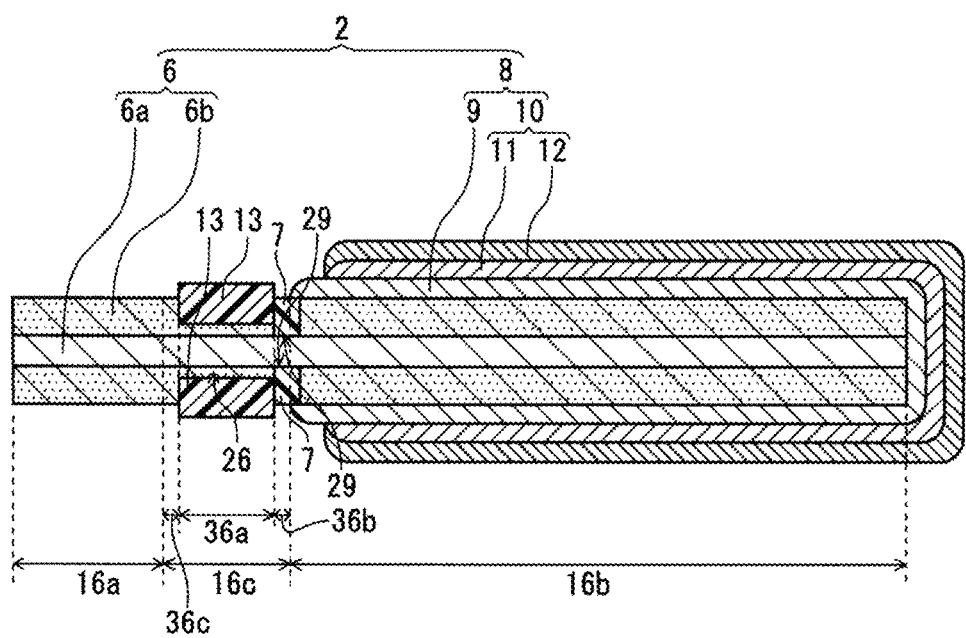
FIG. 14 is a cross-sectional view schematically illustrating a capacitor element included in a solid electrolytic capacitor according to a thirteenth exemplary embodiment of the present disclosure.

FIG. 14 is a cross-sectional view schematically illustrating capacitor element 2 included in a solid electrolytic capacitor according to a thirteenth exemplary embodiment. In FIG. 14, thin part 26 is formed in separation section 16c, and first insulating material 13 is disposed on a surface of thin part 26. In FIG. 14, at least in second region 36b, second groove 29 is formed by removing porous part 6b. Second groove 29 is formed at a position adjacent to first insulating material 13 (or first region 36a). Second groove 29 is filled with second insulating material 7, whereby entry of air is suppressed. In the illustrated example, second groove 29 is formed so as to straddle second region 36b and cathode formation section 16b. Meanwhile, the present invention is not limited to this case, and there may be a case where second groove 29 is formed only in second region 36b. Further, second groove 29 may be formed in a part of second region 36b or may be formed in the entirety of second region 36b.

Second insulating material 7 does not necessarily have to be included so as to fill the entirety of second groove 29 as shown in FIG. 14, and may be disposed in at least a part of second groove 29. Second insulating material 7 may be disposed so as to cover at least a part of second groove 29. Alternatively, second groove 29 may be impregnated with second insulating material 7. For example, second insulating material 7 may be included so as to partially fill second groove 29, or second insulating material 7 may be disposed on at least a part of an inner surface of second groove 29.

Although porous part 6b exists in a part of cathode formation section 16b adjacent to second groove 29, this part may include second insulating material 7 in an impregnated (or filled) state. Although porous part 6b does not exist below second groove 29 in FIG. 14, the present invention is not limited to this case, and porous part 6b may be provided below second groove 29. In the case where porous part 6b is provided below second groove 29, porous part 6b may include second insulating material 7 in an impregnated (or filled) state. From the viewpoint of enhancing the effect of suppressing entry of air, it is preferable that porous part 6b do not exist below second groove 29.

In the case of FIG. 14, a surface of a recess (neck) may be covered with third insulating material 17 as the same in the case of FIG. 3. Further, third insulating material 17 may adhere to at least the periphery of first region 36a. Third insulating material 17 may cover at least a part of at least one of cathode lead-out layer 10 or solid electrolyte layer 9. The position of third insulating material 17 can be referred to in the description of FIG. 3 or 4.

In FIG. 14, the states of second region 36b and third region 36c are different from those in FIG. 6, but the rest of the configuration is the same as in FIG. 6. Hence, the description of FIGS. 1 and 6 can be referred to. Further, in FIG. 14, third region 36c does not need to include second insulating material 7 unlike in the fifth to ninth exemplary embodiments. Meanwhile, the present invention is not limited to this case, and third region 36c may include second insulating material 7 as shown in the fifth to ninth exemplary embodiments. In the thirteenth exemplary embodiment, too, second groove 29 and/or third groove 39 may be formed, and solid electrolyte layer 9 may enter into these grooves as shown in the tenth exemplary embodiment, the eleventh exemplary embodiment, or the twelfth exemplary embodiment.

Hereinafter, the configuration of the solid electrolytic capacitor will be described in more detail.

(Capacitor Element 2, 102A to 102C)

Capacitor elements 2, 102A to 102C each include anode foil 6, a dielectric layer, and cathode part 8. Cathode part 8 includes solid electrolyte layer 9 and cathode lead-out layer 10 covering solid electrolyte layer 9.

The solid electrolytic capacitor has, at minimum, at least one capacitor element 2, and may have a plurality of capacitor elements (capacitor elements 102A to 102C and the like) as shown in FIG. 5. The number of capacitor elements included in the solid electrolytic capacitor may be determined according to the application.

(Anode Foil 6)

Anode foil 6 can include a valve metal, an alloy including a valve metal, a compound including a valve metal, and the like. These materials can be used singly or in combination of two or more kinds thereof. As the valve metal, for example, aluminum, tantalum, niobium, and titanium are preferably used. Anode foil 6 including porous part 6b on a surface of base material part 6a is obtained by roughening a surface of a metal foil including a valve metal by etching, for example.

(Dielectric Layer)

The dielectric layer is formed by anodizing the valve metal on the surface of anode foil 6 by anodizing treatment or the like. The dielectric layer is formed, at minimum, so as to cover at least a part of anode foil 6. The dielectric layer is usually formed on the surface of anode foil 6. Since the dielectric layer is formed on the surface of the porous part of anode foil 6, the dielectric layer is formed along the inner wall surface of pores or pits on the surface of anode foil 6.

The dielectric layer includes an oxide of a valve metal. For example, when tantalum is used as the valve metal, the dielectric layer includes $Ta_2O_5$, and when aluminum is used as the valve metal, the dielectric layer includes $Al_2O_3$. Note that the dielectric layer is not limited thereto, and any dielectric layer may be used as long as the dielectric layer functions as a dielectric body. When the surface of anode foil 6 is porous, the dielectric layer is formed along the surface (including inner wall surface of hole) of anode foil 6.

(First Insulating Material 13)

As first insulating material 13, an insulating resin or the like is used. From the viewpoint of easily disposing on the surface of porous part 6b of separation section 16c, an insulating tape (resist tape or the like) is preferably used as first insulating material 13, but first insulating material is not limited thereto. First insulating material 13 may be a coating film of a coating agent including first insulating material 13. First insulating material 13 may be a thermoplastic resin (or thermoplastic resin composition), or may be a curable resin (or curable resin composition) or a cured product (including semi-cured product) thereof. The curable resin (or curable resin composition) may be a thermosetting resin or a photocurable resin.

Examples of the insulating resin include a curable resin (epoxy resin, polyimide, and the like), a photoresist, and a thermoplastic resin (e.g., polyolefin, polyester, polyamide, thermoplastic polyimide, and the like). The curable resin may be either a thermosetting resin or a photocurable resin. The photocurable resin may be cured by visible light or ultraviolet light. As the insulating resin, a composition of a curable resin may be used. The insulating resin may be used alone, or may be used in combination of two or more kinds thereof.

(Second Insulating Material 7)

As second insulating material 7, an insulating resin or the like is used. From the viewpoint of easily securing high permeability or penetrability into porous part 6b, first groove 19, or second groove 29, second insulating material 7 is preferably a cured product (including semi-cured product) of a curable resin or a composition thereof. The curable resin may be a thermosetting resin or a photocurable resin. Examples of the photocurable resin or the composition thereof include those cured by ultraviolet rays, visible light, or the like. From the viewpoint of easily impregnating or filling first groove 19 or second groove 29, it is preferable to use a photocurable (in particular, ultraviolet curability) resin or a composition thereof. Examples of the curable resin include those described later. The curable resin composition may include, for example, at least one selected from the group consisting of a curing agent, a curing accelerator, a catalyst, and an additive.

(Third Insulating Material 17)

As third insulating material 17, an insulating resin or the like is used. Third insulating material 17 may be a thermoplastic resin, or may be a cured product of a curable resin or a composition thereof. Third insulating material 17 may be the same as or different from second insulating material 7. Examples of the curable resin include those exemplified later for second insulating material 7.

Examples of the thermoplastic resin include at least one selected from the group consisting of vinyl resin (e.g., vinyl chloride, vinyl acetate, and aromatic vinyl resin), polyolefin (e.g., polyethylene and polypropylene), acrylic resin, polyamide, polycarbonate, thermoplastic polyimide, and polyamideimide. Examples of the aromatic vinyl resin include polystyrene and an acrylonitrile-butadiene-styrene copolymer (ABS resin).

(Fourth Insulating Material 117)

Fourth insulating material 117 can be selected from those exemplified as third insulating material 17, for example. From the viewpoint of easily forming a thin film, fourth insulating material 117 is preferably a cured product of a curable resin or a composition thereof. The curable resin may be thermosetting or photocurable. Fourth insulating material 117 may be the same as or different from second insulating material 7. Fourth insulating material 117 may be the same as or different from third insulating material 17.

(Cathode Part 8)

(Solid Electrolyte Layer 9)

Solid electrolyte layer 9 constituting cathode part 8 includes a conductive polymer, but may also include a dopant, an additive, or the like as necessary. Examples of the conductive polymer include polypyrrole, polythiophene, polyaniline, and derivatives thereof. Solid electrolyte layer 9 can be formed by chemical polymerization and/or electrolytic polymerization of a raw material monomer, for example. Alternatively, solid electrolyte layer 9 can be formed by bringing the dielectric layer into contact with a solution in which the conductive polymer is dissolved or a dispersion liquid in which the conductive polymer is dispersed. Solid electrolyte layer 9 is formed, at minimum, so as to cover at least a part of the dielectric layer. In the case of electrolytic polymerization, a conductive precoat layer may be formed prior to electrolytic polymerization. Solid electrolyte layer 9 may be formed directly on the dielectric layer or may be formed with a precoat layer interposed therebetween.

(Cathode Lead-Out Layer 10)

Cathode lead-out layer 10 constituting cathode part 8 includes carbon layer 11 and metal paste layer 12. Carbon layer 11 has, at minimum, conductivity, and can be made of, for example, a conductive carbon material such as graphite. Metal paste layer 12 may be a silver paste layer. For the silver paste layer, a composition including a silver powder and a binder resin (epoxy resin or the like) can be used, for example. Note that cathode lead-out layer 10 is not limited to this configuration, and may be configured in any way as long as it has a current collecting function. Cathode lead-out layer 10 is formed so as to cover at least a part of solid electrolyte layer 9.

(Exterior Body 3)

Exterior body 3 covers a part of capacitor element 2 and lead terminals 4, 5. From the viewpoint of suppressing entry of air into exterior body 3, it is preferable that capacitor element 2 and a part of each of lead terminals 4, 5 are sealed with exterior body 3. Although FIGS. 1 and 2 show the case where exterior body 3 is a resin exterior body, the present invention is not limited to this case, and exterior body 3 may be a case or the like capable of housing capacitor element 2. The resin exterior body is formed by sealing capacitor element 2 and a part of each of lead terminals 4 and 5 with a resin material. Examples of the case include a combination of a container that houses capacitor element 2 and a sealing body that covers an opening of the container. The container and the sealing body are formed of a metal material or a resin material, for example.

The resin exterior body preferably includes a cured product of a curable resin composition, and may include a thermoplastic resin or a composition including the thermoplastic resin. Examples of the resin material forming the case include a thermoplastic resin or a composition including the thermoplastic resin. Examples of the metal material forming the case include metals such as aluminum, copper, and iron, or alloys thereof (also including stainless steel, brass, and the like).

(Lead Terminals 4, 5)

One end of each of lead terminals 4, 5 is electrically connected to capacitor element 2, and the other end of lead terminals 4, 5 is drawn out of exterior body 3. In solid electrolytic capacitor 1, the one end of each of lead terminals 4, 5 is covered with exterior body 3 together with capacitor element 2. A lead terminal usually used in a solid electrolytic capacitor can be used as lead terminals 4, 5, without particular limitation. And a so-called lead frame, for example, may be used as lead terminals 4, 5. Examples of the material of lead terminals 4, 5 include a metal such as copper or an alloy thereof.

[Method for Manufacturing Solid Electrolytic Capacitor]

The solid electrolytic capacitor can be manufactured, for example, by a manufacturing method including: a step (first step) of preparing a capacitor element, a step (second step) of electrically connecting a lead terminal to the capacitor element, and a step (third step) of covering a part of the capacitor element and the lead terminal with an exterior body.

Hereinafter, each step will be described in more detail.

(First Step)

In the first step, capacitor elements 2, 102A to 102C are produced. The first step can include a step of preparing anode foil 6, a step of forming a dielectric layer, a step of forming separation section 16c, a step of disposing or impregnating with first insulating material 13, a step of forming solid electrolyte layer 9, and a step of forming cathode lead-out layer 10. The first step can include a step of disposing or impregnating at least a part of separation section 16c with the second insulating material. The first step may include a step of covering at least a part of first insulating material 13, solid electrolyte layer 9, cathode lead-out layer 10, or the like with third insulating material 17.

(Step of Preparing Anode Foil 6)

Anode foil 6 can be prepared, for example, by roughening a surface of a metal foil including a valve metal. Porous part 6b is formed on a surface of base material part 6a by roughening. The roughening may be performed in any way as long as irregularities can be formed on the surface of the base material part. The roughening may be performed by etching (e.g., electrolytic etching) the surface of the metal foil, for example.

(Step of Forming Dielectric Layer)

In this step, a dielectric layer is formed on anode foil 6. The dielectric layer is formed by anodizing anode foil 6. The anodization can be performed by a known method such as an anodizing treatment. The anodizing treatment can be performed, for example, by immersing anode foil 6 in an anodizing solution and applying a voltage between anode foil 6 as an anode and a cathode immersed in the anodizing solution. As the anodizing solution, for example, a phosphoric acid aqueous solution or the like is preferably used.

(Step of Forming Separation Section 16c)

Anode foil 6 on which the dielectric layer is formed is defined into anode section 16a, cathode formation section 16b, and separation section 16c located between anode section 16a and cathode formation section 16b. Then, at least a part of porous part 6b is compressed and/or removed in at least a part of separation section 16c. For example, in at least a part of separation section 16c, porous part 6b may be compressed or partially removed to form a groove (or thin part 26). If necessary, compression and removal may be combined. The compression can be performed by press working or the like. The removal of porous part 6b can be performed by cutting, laser processing, or the like.

In a case where first groove 19 is formed in third region 36c, first groove 19 may be formed in this step. First groove 19 can be formed by compressing or removing porous part 6b in third region 36c, as the same in the case of the groove described above. First groove 19 may be formed continuously with first region 36a or may be formed to be apart from first region 36a.

In a case where second groove 29 is formed in second region 36b, second groove 29 may be formed in this step. Second groove 29 can be formed by compressing or removing porous part 6b in second region 36b, as the same in the case of the groove described above. Second groove 29 may be formed continuously with first region 36a or may be formed apart from first region 36a.

In a case where third groove 39 is formed in cathode formation section 16b, third groove 39 may be formed in this step. Third groove 39 can be formed by compressing or removing porous part 6b in cathode formation section 16b, as the same in the case of the groove described above. Third groove 39 may be formed continuously with second region 36b or may be formed apart from second region 36b.

Note that first groove 19 and second groove 29 do not necessarily have to be formed in this step, and may be formed after this step and before the step of forming solid electrolyte layer 9. Third groove 39 does not necessarily have to be formed in this step, and may be formed after the step of forming the dielectric layer and before the step of forming solid electrolyte layer 9.

(Step of Disposing or Impregnating with First Insulating Material 13)

First insulating material 13 is disposed in or used to impregnate at least a part of separation section 16c. First insulating material 13 is preferably disposed on a surface of thin part 26. For example, first insulating material 13 may be disposed by attaching an insulating tape (such as resist tape) to a surface of separation section 16c, or may be disposed on a surface of porous part 6b by coating with a coating agent including first insulating material 13. By disposing first insulating material 13 prior to the step of forming solid electrolyte layer 9, it is possible to suppress the creeping of the conductive polymer toward anode section 16a when solid electrolyte layer 9 is formed. Examples of the first insulating material include an insulating resin.

In the solid electrolytic capacitor according to a second aspect of the present disclosure, first insulating material 13 may be formed by impregnating at least a part of separation section 16c with a coating agent including first insulating material 13. Alternatively, first insulating material 13 may be disposed by attaching an insulating tape to the surface of separation section 16*c*, and at least a part of separation section 16*c* may be impregnated with a coating agent including first insulating material 13. Any of the impregnation with the coating agent and the placement of the insulating tape can be performed first.

(Step of Forming Solid Electrolyte Layer 9)

In this step, solid electrolyte layer 9 is formed on the dielectric layer. Solid electrolyte layer 9 is formed, at minimum, so as to cover at least a part of the dielectric layer. Solid electrolyte layer 9 includes a conductive polymer, but may also include a dopant, an additive, or the like as necessary.

As the conductive polymer, for example, polypyrrole, polythiophene (poly (3,4-ethylenedioxythiophene) (PEDOT), and the like), polyaniline, derivatives thereof, and the like are used. As the dopant, for example, paratoluenesulfonic acid, naphthalenesulfonic acid, polystyrenesulfonic acid (PSS), or the like is used.

Solid electrolyte layer 9 can be formed by chemical polymerization and/or electrolytic polymerization of a raw material monomer, for example. Alternatively, the solid electrolyte layer 9 can be formed by bringing the dielectric layer into contact with a solution in which the conductive polymer is dissolved or a solution or dispersion liquid in which the conductive polymer is dissolved or dispersed in a liquid medium (solvent or the like). Examples of the liquid medium include water, an organic solvent, and a mixture thereof. In particular, at the outer surface (the surface opposite to dielectric layer) of the solid electrolyte layer, the electrolytic polymerization easily proceeds and thus solid electrolyte layer 9 tends to be densely formed. On the other hand, at the inside surface of the solid electrolyte layer, the electrolytic polymerization hardly proceeds, and thus voids in the solid electrolyte layer tend to be generated. Hence, air easily enters capacitor element 2 through the voids. From this, the effect of filling porous part 6*b* with the second insulating material is remarkably exhibited particularly when solid electrolyte layer 9 is formed by electrolytic polymerization. Note that in the case of electrolytic polymerization, a precoat layer may be formed on the dielectric layer prior to electrolytic polymerization. The precoat layer is made of a conductive material (conductive polymer, inorganic conductive material, and the like), for example. The conductive material constituting the precoat layer is not particularly limited, and a known material can be used, for example.

When solid electrolyte layer 9 is disposed in at least a part (e.g., at least a part of second groove 29) of second region 36*b* in separation section 16*c*, solid electrolyte layer 9 can be formed in second region 36*b* by, for example, performing chemical polymerization or electrolytic polymerization while second region 36*b* is in contact with a polymerization liquid, or bringing a solution or dispersion liquid containing a conductive polymer into contact with second region 36*b*.

When solid electrolyte layer 9 is disposed in at least a part of third groove 39, solid electrolyte layer 9 can be formed in third groove 39 by, for example, performing chemical polymerization or electrolytic polymerization while third groove 39 is in contact with a polymerization liquid, or bringing a solution or dispersion liquid containing a conductive polymer into contact with third groove 39.

(Step of Forming Cathode Lead-Out Layer 10)

In this step, carbon layer 11 and metal paste layer 12 are sequentially laminated on solid electrolyte layer 9 to form cathode lead-out layer 10.

Note that as shown in FIG. 5, when a plurality of capacitor elements are laminated, a laminated body of the capacitor elements may be prepared in the first step by producing each capacitor element as described above and then laminating the plurality of capacitor elements.

(Step of Disposing or Impregnating with Second Insulating Material)

The second insulating material may be disposed in or used to impregnate at least a part of separation section 16*c*. When second groove 29 is provided so as to straddle separation section 16*c* and cathode formation section 16*b*, second groove 29 may be impregnated with second insulating material 7. In this case, second insulating material 7 is included not only in a part of separation section 16*c* but also in a part of cathode formation section 16*b*.

The method for manufacturing a solid electrolytic capacitor according to a first aspect of the present disclosure can include a step of impregnating porous part 6*b* of at least first region 36*a* with the second insulating material. Porous part 6*b* of at least first region 36*a* may be impregnated (or filled) with the second insulating material. Porous part 6*b* of at least first region 36*a* is filled with the second insulating material by impregnating the periphery of first insulating material 13 with the second insulating material. At this time, porous part 6*b* of at least one of second region 36*b* at a side close to cathode formation section 16*b* or third region 36*c* at a side close to anode section 16*a* may be impregnated (or filled) with the second insulating material. Further, as in the case of FIG. 4, metal paste layer 12 may be impregnated with the second insulating material.

When manufacturing the solid electrolytic capacitor according to the second aspect of the present disclosure, second insulating material 7 may be disposed in or used to impregnate at least a part of a region located closer to anode section 16*a* than first insulating material 13 (i.e., third region 36*c*) in separation section 16*c*. For example, first groove 19 may be formed in at least a part of third region 36*c*, and second insulating material 7 may be disposed in at least a part of first groove 19. At this time, second insulating material 7 may be disposed so as to cover at least a part of first groove 19. Alternatively, porous part 6*b* in at least a part of third region 36*c* may be impregnated with second insulating material 7. These configurations may be combined.

Second insulating material 7 may be disposed in or used to impregnate at least third region 36*c*. First groove 19 is preferably impregnated or filled with second insulating material 7. First region 36*a* and/or second region 36*b* at a side close to cathode formation section 16*b* may be impregnated or filled with second insulating material 7. For example, first region 36*a* may be filled with second insulating material 7 by impregnating the periphery of first insulating material 13 with second insulating material 7. Porous part 6*b* located closer to anode section 16*a* than third region 36*c* may be impregnated or filled with second insulating material 7.

When manufacturing the solid electrolytic capacitor according to a fifth aspect of the present disclosure, second insulating material 7 is disposed in at least a part of second groove 29 formed to be adjacent to first insulating material 13 (or first region 36*a*) at a side close to cathode formation section 16*b* in separation section 16*c*. At least a part of second groove 29 may be covered with second insulating material 7. Second groove 29 may be impregnated or filled with second insulating material 7. By impregnating second groove 29 with the second insulating material, at least a part of cathode formation section 16b located adjacent to second groove 29 may be impregnated or filled with the second insulating material.

The step of impregnating with second insulating material 7 may be performed after the step of forming cathode lead-out layer 10. Metal paste layer 12 may be impregnated with second insulating material 7.

Note that when the step of impregnating with second insulating material 7 is performed after the step of forming cathode lead-out layer 10, second insulating material 7 may be disposed so as to cover at least a part of solid electrolyte layer 9 or cathode lead-out layer 10. Second insulating material 7 may be disposed so as to cover at least a part of a surface of a recess (neck) between cathode part 8 and separation section 16c (or first insulating material 13). Second insulating material 7 disposed so as to cover at least a part of solid electrolyte layer 9, cathode lead-out layer 10, the neck, and the like corresponds to third insulating material 17 in FIG. 3 or 4. Third insulating material 17 disposed in this manner is the same material as second insulating material 7.

The second insulating material can be supplied to the surfaces of first region 36a, second region 36b, third region 36c, porous part 6b, and capacitor element 2 by a known coating method. The second insulating material is supplied by using, for example, a coating method or a dispensing method using various coaters or dispenses, immersion, transfer (roller transfer or the like), or the like.

From the viewpoint of easily impregnating first groove 19, second groove 29, or porous part 6b with the second insulating material, it is preferable to use a curable resin (or a composition thereof) as the second insulating material. The curable resin may be a photocurable resin or a thermosetting resin. Examples of the curable resin include, but are not limited to, epoxy resin, phenol resin, unsaturated polyester resin, thermosetting polyurethane resin, and thermosetting polyimide. The curable resins may be used alone, or may be used in combination of two or more kinds thereof. The curable resin may be a one-component curable resin or a two-component curable resin. The curable resin composition may include, for example, at least one selected from the group consisting of a curing agent, a curing accelerator, a catalyst, and an additive.

From the viewpoint of easily impregnating first groove 19, second groove 29, or porous part 6b with the second insulating material, the curable resin (or composition) supplied to porous part 6b preferably has a low viscosity. The viscosity of the curable resin (or composition) at 25° C. is equal to or less than 300 mPa·s, and more preferably equal to or less than 100 mPa·s, for example.

Note that the viscosity of the curable resin (or composition) can be measured under the condition of a rotation speed of 60 rpm using a cone-plate viscometer.

Since it is preferable that the thermosetting resin (or composition) have a low viscosity, the thermosetting resin (or composition) may include a solvent. From the viewpoint of easily and efficiently filling many voids included in first groove 19, second groove 29, or porous part 6b with the second insulating material, a solvent-free curable resin (or composition) is preferably used.

The curable resin includes, for example, a polyfunctional compound having two or more polymerizable functional groups involved in the curing reaction and/or a monofunctional compound having one polymerizable functional group. From the viewpoint of lowering the viscosity of the curable resin (or composition), the curable resin (or composition) preferably includes at least a monofunctional compound. The curable resin may include a monofunctional compound and a polyfunctional compound. In the case of epoxy resin, for example, a monofunctional glycidyl compound (glycidyl ether of monohydroxy compound, glycidyl amine, and the like) and a polyfunctional glycidyl compound (polyglycidyl ether of polyhydroxy compound, polyglycidyl amine, and the like) may be combined. The polyfunctional compound may have, for example, 2 to 4 or 2 or 3 polymerizable functional groups.

The proportion of the monofunctional compound in the curable resin is, for example, preferably equal to or more than 50 mass %, and may be equal to or more than 70 mass %. When the proportion of the monofunctional compound is in such a range, the viscosity of the curable resin (or composition) can be lowered even if the content of the solvent is low (in particular, even when solvent-free curable resin (or composition) is used). The proportion of the monofunctional compound in the curable resin is, for example, equal to or less than 90 mass %, and may be equal to or less than 85 mass %. The lower limit value and the upper limit value can be arbitrarily combined.

The curable resin composition preferably includes a curing agent. The curing agent is selected according to the type of the curable resin. For example, in the case of epoxy resin, examples of the curing agent include at least one selected from the group consisting of an amine compound, an acid anhydride, a phenol compound, a polymerized catalyst, and a latent curing agent.

The curing agent may be combined with a curing accelerator. The curing accelerator is selected according to the type of the curable resin. Examples of the curing accelerator include tertiary amines or salts thereof, imidazole, phosphine, phosphonium salts, and sulfonium salts.

The thermosetting resin (or composition) that has been supplied to the surface of capacitor element 2 or the second insulating material that has filled first groove 19, second groove 29, or porous part 6b may be cured in at least one of this step or the subsequent step, as necessary.

(Step of Covering Solid Electrolyte Layer 9, Cathode Lead-Out Layer 10 or Other Parts with Third Insulating Material)

The first step may include a step of covering, with third insulating material 17, at least a part of at least one selected from the group consisting of the first insulating material, solid electrolyte layer 9, cathode lead-out layer 10, and the neck. Third insulating material 17 may be the same as or different from the second insulating material. This step may be performed after the step of forming cathode lead-out layer 10.

By coating, with a coating agent including third insulating material 17, at least a part of a surface of at least one selected from the group consisting of the first insulating material, solid electrolyte layer 9, cathode lead-out layer 10, and the neck, the surface can be covered with the third insulating material. Third insulating material 17 is supplied to the surface using, for example, a coating method or a dispensing method using various coaters or dispenses, immersion, transfer (roller transfer, or the like), or the like.

The curable resin (or curable resin composition) disposed on the surface by coating or the like may be cured in at least one of this step or the subsequent step, as necessary.

(Step of Covering a Part of Laminated Body with Fourth Insulating Material 117)

As shown in FIG. 5, when a plurality of capacitor elements are laminated, the first step may further include a step of covering at least a part of a surface of the laminated body with fourth insulating material 117. In this case, fourth insulating material 117 may be the same as or different from second insulating material 7. Further, fourth insulating material 117 may be the same as or different from third insulating material 17.

For example, as in the case of third insulating material 17, a coating agent including fourth insulating material 117 is coated on at least a part of the surface of the laminated body, whereby a film of fourth insulating material 117 is formed on the surface of the laminated body.

The curable resin (or curable resin composition) disposed so as to cover at least a part of the surface of the laminated body by coating or the like may be cured in at least one of this step or the subsequent step, as necessary.

(Second Step)

In the second step, each of anode lead terminal 4 and cathode lead terminal 5 is electrically connected to capacitor elements 2, 102A to 102C. The lead terminals may be connected after the capacitor element is produced in the first step. While cathode lead terminal 5 is connected to the capacitor element after the capacitor element is produced, anode lead terminal 4 may be connected to anode foil 6 at an appropriate stage in the step of producing the capacitor element.

When a laminated body of a plurality of capacitor elements is used, anode lead terminal 4 can be connected to anode foil 6 in the same manner as described above. Cathode lead terminal 5 may be connected to a capacitor element in the same manner as described above, or one end of cathode lead terminal 5 may be connected to a laminated body of a plurality of capacitor elements in which cathode parts 8 are electrically connected to each other.

(Third Step)

In the third step, capacitor elements 2, 102A to 102C and a part of each of lead terminals 4, 5 are covered with exterior body 3, so that the capacitor elements are sealed with exterior body 3. The sealing can be performed according to the type of exterior body 3.

For example, when a case-shaped exterior body including a container and a sealing body is used, a capacitor element is housed in the container, and an opening of the container can be covered and sealed with a sealing body in a state where the other end of a lead terminal connected to the capacitor element is drawn out from a through hole formed in the sealing body.

When the resin exterior body is adopted, capacitor element 2 and lead terminals 4, 5 are electrically connected to each other, and then capacitor element 2 and a part of each of lead terminals 4, 5 are covered with a resin forming the resin exterior body to be sealed. The resin exterior body can be formed by using a molding technique such as injection molding, insert molding, or compression molding.

EXAMPLES

Hereinafter, the present disclosure will be specifically described based on examples and comparative examples, but the present disclosure is not limited to the following examples.

Example 1

Solid electrolytic capacitor A1 including a laminated body in which seven capacitor elements 2 shown in FIG. 2 were laminated was produced in the following manner.

(1) Production of Capacitor Element 2

An aluminum foil (thickness of 100 μm) was prepared as a base material, and a surface of the aluminum foil was subjected to an etching treatment to obtain anode foil 6 including porous part 6b. Anode foil 6 was immersed in a phosphoric acid solution (liquid temperature of 70° C.) having a concentration of 0.3 mass %, and a direct-current voltage of 70 V was applied for 20 minutes to form a dielectric layer including aluminum oxide ($Al_2O_3$) on a surface of anode foil 6. Anode foil 6 was defined into anode section 16a, cathode formation section 16b, and separation section 16c therebetween, and a part of separation section 16c was compressed by press working to form thin part 26. Insulating resist tape (first insulating material) 13 was attached to thin part 26.

Anode foil 6 on which the dielectric layer was formed was immersed in a liquid composition including a conductive material to form a precoat layer.

A polymerization liquid containing pyrrole (monomer of conductive polymer), naphthalenesulfonic acid (dopant), and water was prepared. Anode foil 6 on which the dielectric layer and the precoat layer were formed was immersed in the obtained polymerization liquid, and electropolymerization was performed at an applied voltage of 3 V to form solid electrolyte layer 9.

A dispersion liquid in which graphite particles were dispersed in water was applied to solid electrolyte layer 9, and then solid electrolyte layer 9 was dried to form carbon layer 11 on a surface of solid electrolyte layer 9. Then, a silver paste containing silver particles and a binder resin (epoxy resin) was applied onto a surface of carbon layer 11, and then the binder resin was cured by heating to form metal paste layer (silver paste layer) 12. Cathode lead-out layer 10 composed of carbon layer 11 and metal paste layer 12 was thus formed. Cathode part 8 formed of solid electrolyte layer 9 and cathode lead-out layer 10 was thus formed.

Then, a two-component curable epoxy resin (solvent-free type, viscosity (25° C.): 100 mPa·s) was supplied around the resist tape by roller transfer to impregnate porous part 6b of anode foil 6 with the epoxy resin. As a result, porous part 6b (porous part 6b of second region 36b and third region 36c) around the resist tape and the region of porous part 6b of first region 36a covered with the resist tape were impregnated with the epoxy resin. Then, the impregnated epoxy resin was cured.

In this way, capacitor element 2 was formed. Note that as the epoxy resin, liquid A composed of 4-tert butyl phenyl glycidyl ether: bisphenol F type epoxy resin (mass ratio) =75:25 and liquid B containing an acid anhydride curing agent and an imidazole curing accelerator were mixed and used.

(2) Assembly of Solid Electrolytic Capacitor 1

Anode lead terminal 4, cathode lead terminal 5, and adhesive layer 14 were also disposed on capacitor element 2 obtained in (1). Exterior body 3 was formed by sealing, with a resin, a laminated body in which seven such capacitor elements 2 were laminated, thereby completing solid electrolytic capacitor A1.

Example 2

Solid electrolytic capacitor A2 including a laminated body in which seven capacitor elements 2 shown in FIG. 4 were laminated was produced.

After cathode lead-out layer 10 was formed, capacitor element 2 was immersed in the same epoxy resin as the epoxy resin used in Example 1 up to the periphery of the resist tape (first insulating material 13) at a side close to anode section 16a, was taken out, and then the epoxy resin was cured. Other than this, solid electrolytic capacitor 1 was completed in the same manner as in Example 1. In Example 2, porous part 6b (porous part 6b of second region 36b and third region 36c) around the resist tape and the region of porous part 6b of first region 36a covered with the resist tape are impregnated with the epoxy resin. Further, a surface of the solid electrolyte layer or the first insulating material between the first insulating material and the end of cathode lead-out layer 10 at a side close to the anode section is covered with the epoxy resin. Metal paste layer 12 is also impregnated with the epoxy resin.

Comparative Example 1

A solid electrolytic capacitor R1 was produced in the same manner as in Example 1 except that the epoxy resin was not supplied to the periphery of the resist tape or a surface of the capacitor element.

Evaluation

For the solid electrolytic capacitors of Examples 1 and 2 and Comparative Example 1 produced above, the change rates in capacitance, ESR, and dielectric loss tangent tan δ were evaluated in the following procedure.

Under an environment of 20° C., an initial capacitance value C0 (μF), an initial ESR value X0 (mΩ) at a frequency of 100 kHz and an initial dielectric loss tangent tan δ0 at 120 kHz with respect to the solid electrolytic capacitor were measured using an LCR meter for 4-terminal measurement. Next, a rated voltage was applied to the solid electrolytic capacitor at a temperature of 145° C. for 1000 hours (heat resistance test). Thereafter, a capacitance value C1 (μF), an ESR value (X1) (mΩ), and a dielectric loss tangent tan δ1 were measured in the same manner as described above. Then, a value obtained by subtracting the initial capacitance value C0 from the capacitance value C1 was divided by the initial capacitance value C0 and multiplied by 100 to obtain a change rate (%) of the capacitance. Further, a value obtained by subtracting the initial ESR value X0 from the ESR value X1 was divided by the ESR value X0 and multiplied by 100 to obtain a change rate (%) of the ESR. Further, a value obtained by subtracting the initial dielectric loss tangent tan δ0 from the dielectric loss tangent tan δ1 was divided by the dielectric loss tangent tan δ0 and multiplied by 100 to obtain a change rate (%) of the dielectric loss tangent tan δ.

The results are shown in Table 1.

TABLE 1

|    | Change rate of capacitance (%) | Change rate of ESR (%) | Change rate of tanδ (%) |
|----|--------------------------------|------------------------|-------------------------|
| A1 | −12.6                          | 55.4                   | 12.6                    |
| A2 | −5.6                           | 36.3                   | 48.6                    |
| R1 | −38.2                          | 4484.3                 | 1505.6                  |

In Examples 1 and 2, the change rate in each of capacitance, ESR, and tan δ was smaller than that in Comparative Example 1. In Examples 1 and 2, it is considered that by impregnating porous part 6b of first region 36a and other parts with the second insulating material (epoxy resin), the contact of air with solid electrolyte layer 9 was suppressed, and the deterioration of the conductive polymer was suppressed, so that heat resistance of the solid electrolytic capacitor was improved.

Example 3

A solid electrolytic capacitor including a laminated body in which seven capacitor elements 2 shown in FIG. 6 were laminated was produced in the following manner.

In step (1) of Example 1, insulating resist tape (first insulating material) 13 was attached to a part of thin part 26 at a side close to cathode formation section 16b. Thus, first groove 19 is formed by thin part 26 and the resist tape in a region located closer to anode section 16a than the resist tape.

Then, a two-component curable epoxy resin (solvent-free type, viscosity (25° C.): 100 mPa·s) was supplied to first groove 19 by roller transfer to impregnate porous part 6b of anode foil 6 with the epoxy resin. As a result, first groove 19 was impregnated with the epoxy resin, and porous part 6b around first groove 19 (porous part 6b of third region 36c, part of porous part 6b of first region 36a, and porous part 6b at a side close to anode section 16a adjacent to third region 36c) was impregnated with the epoxy resin. Then, the impregnated epoxy resin was cured.

Other than these, a solid electrolytic capacitor (electrolytic capacitor A3) was produced in the same manner as in Example 1.

Comparative Example 2

A solid electrolytic capacitor (solid electrolytic capacitor R2) was produced in the same manner as in Example 3 except that the epoxy resin was not supplied to the periphery of the resist tape or a surface of the capacitor element.

Example 4

A solid electrolytic capacitor including a laminated body in which seven capacitor elements 2 shown in FIG. 12 were laminated was produced in the following manner.

In step (1) of Example 3, a part (second region 36b) of cathode formation section 16b in thin part 26 was laser-etched to form second groove 29. A resist tape was attached to the entire surface of thin part 26. Further, no epoxy resin was supplied around the resist tape or to the surface of the capacitor element. Other than these, a solid electrolytic capacitor (solid electrolytic capacitor A4) was produced in the same manner as in Example 3.

Examples 3 and 4 and Comparative Example 2 were evaluated in the same manner as in Example 1. The results are shown in Table 2.

TABLE 2

|    | Change rate of capacitance (%) | Change rate of ESR (%) | Change rate of tanδ (%) |
|----|--------------------------------|------------------------|-------------------------|
| A3 | −1.2                           | 680                    | 16                      |
| A4 | −1.3                           | 600                    | 19                      |
| R2 | −6.6                           | 800                    | 320                     |

In Examples 3 and 4, the change rate in each of capacitance, ESR, and tan δ was smaller than that in Comparative Example 2. In Example 3, it is considered that by impregnating third region 36c with the second insulating material (epoxy resin), the contact of air with solid electrolyte layer 9 was suppressed, and the deterioration of the conductive polymer was suppressed, so that heat resistance of the solid electrolytic capacitor was improved. Further, in Example 4, it is considered that since the conductive polymer was disposed in second groove 29, air hardly entered second region 36b, and deterioration of the conductive polymer in solid electrolyte layer 9 at a side close to cathode formation section 16b was suppressed.

Although the present invention has been described in terms of presently preferred exemplary embodiments, such disclosure should not be construed in a limiting manner. Various modifications and alterations will undoubtedly become apparent to those skilled in the art to which the present invention belongs upon reading the above disclosure. Accordingly, the appended claims are to be construed to cover all modifications and alterations without departing from the true spirit and scope of the present invention.

In the solid electrolytic capacitor according to the present disclosure, deterioration of the conductive polymer included in the solid electrolyte layer is suppressed even when the solid electrolytic capacitor is exposed to a high-temperature atmosphere, and a decrease in capacitance can be suppressed. It is also possible to suppress an increase in ESR and an increase in tan δ. Hence, the electrolytic capacitor can be used in various applications such as applications requiring low ESR and high capacitance of the solid electrolytic capacitor, and applications exposed to heat. These applications are merely examples, and the present invention is not limited thereto.

The invention claimed is:

1. A solid electrolytic capacitor comprising:
a capacitor element including:
an anode foil including a base material part and a porous part disposed on a surface of the base material part;
a dielectric layer disposed on at least a part of a surface of the anode foil;
a solid electrolyte layer covering at least a part of the dielectric layer; and
a cathode lead-out layer covering at least a part of the solid electrolyte layer, wherein:
the anode foil includes an anode section on which the solid electrolyte layer is not disposed, a cathode formation section on which the solid electrolyte layer is disposed, and a separation section located between the anode section and the cathode formation section,
a first insulating material is disposed on a surface of the porous part in the separation section,
at least a part of a first region of the porous part includes a second insulating material, the first region being covered with the first insulating material,
the first insulating material includes an insulating tape attached to the surface of the porous part in the first region, and
the second insulating material is filled to be cured in a void of the porous part in the first region.

2. The solid electrolytic capacitor according to claim 1, wherein the second insulating material is included in a second region of the porous part, the second region being located between the first insulating material and the cathode formation section.

3. The solid electrolytic capacitor according to claim 1, wherein the second insulating material is included in a third region of the porous part, the third region being located closer to the anode section than the first insulating material.

4. The solid electrolytic capacitor according to claim 1, wherein the second insulating material is included in the porous part in the cathode formation section.

5. The solid electrolytic capacitor according to claim 1, wherein at least a part of the cathode lead-out layer includes the second insulating material.

6. The solid electrolytic capacitor according to claim 1, wherein a third insulating material covers at least a part of the solid electrolyte layer between the first insulating material and an end of the cathode lead-out layer, the end of the cathode lead-out layer being at a side close to the anode section.

7. The solid electrolytic capacitor according to claim 1, wherein the third insulating material covers at least a part of the cathode lead-out layer.

8. The solid electrolytic capacitor according to claim 1 comprising a laminated body in which a plurality of the capacitor elements are laminated, each of the plurality of the capacitor elements being the capacitor element,
wherein a fourth insulating material covers at least a part of a surface of the laminated body.

9. A solid electrolytic capacitor comprising:
a capacitor element including:
an anode foil including a base material part and a porous part disposed on a surface of the base material part;
a dielectric layer disposed on a surface of the anode foil;
a solid electrolyte layer covering at least a part of the dielectric layer; and
a cathode lead-out layer covering at least a part of the solid electrolyte layer, wherein:
the anode foil includes an anode section on which the solid electrolyte layer is not disposed, a cathode formation section on which the solid electrolyte layer is disposed, and a separation section located between the anode section and the cathode formation section,
a first insulating material is disposed on or included in at least a part of the separation section,
the capacitor element further includes a second insulating material in at least a part of a region of the separation section, the region of the separation section being located closer to the anode section than the first insulating material,
a first groove is formed in at least a part of the region of the separation section, the region of the separation section being located closer to the anode section than the first insulating material, and
the second insulating material is disposed in at least a part of the first groove.

10. The solid electrolytic capacitor according to claim 9, wherein the porous part includes at least a part of the second insulating material.

11. The solid electrolytic capacitor according to claim 9, wherein the first groove is formed to be adjacent to the first insulating material.

12. The solid electrolytic capacitor according to claim 9, wherein the first groove is formed to be apart from the first insulating material.

13. The solid electrolytic capacitor according to claim 9, wherein the second insulating material is included in the porous part in a periphery of the first groove.

14. A solid electrolytic capacitor comprising:
a capacitor element including:
an anode foil including a base material part and a porous part disposed on a surface of the base material part;
a dielectric layer disposed on a surface of the anode foil;
a solid electrolyte layer covering at least a part of the dielectric layer; and
a cathode lead-out layer covering at least a part of the solid electrolyte layer, wherein:
the anode foil includes an anode section on which the solid electrolyte layer is not disposed, a cathode formation section on which the solid electrolyte layer is disposed, and a separation section located between the anode section and the cathode formation section,
a first insulating material is disposed on or included in at least a part of the separation section, the capacitor element further includes a second insulating material in at least a part of a region of the separation section, the region of the separation section being located closer to the anode section than the first insulating material, and
a third insulating material covers at least a part of a surface of the first insulating material and at least a part of a surface of the solid electrolyte layer, the surface of the solid electrolyte layer being not covered with the cathode lead-out layer.

15. A solid electrolytic capacitor comprising:

a capacitor element including:

an anode foil including a base material part and a porous part disposed on a surface of the base material part;

a dielectric layer disposed on a surface of the anode foil;

a solid electrolyte layer covering at least a part of the dielectric layer; and a cathode lead-out layer covering at least a part of the solid electrolyte layer, wherein:

the anode foil includes an anode section on which the solid electrolyte layer is not disposed, a cathode formation section on which the solid electrolyte layer is disposed, and a separation section located between the anode section and the cathode formation section;

a first insulating material is disposed on or included in at least a part of the separation section;

a groove is formed to be adjacent to the first insulating material at a side close to the cathode formation section in the separation section;

the solid electrolyte layer is disposed in at least a part of the groove, and a second insulating material is further disposed in at least a part of the groove.

* * * * *